US008996655B2

(12) United States Patent
McLennan et al.

(10) Patent No.: US 8,996,655 B2
(45) Date of Patent: Mar. 31, 2015

(54) METHOD FOR HORIZONTAL SCALE DELTA ENCODING

(71) Applicant: Autodesk, Inc., San Rafael, CA (US)

(72) Inventors: Christopher S. McLennan, Cincinnati, OH (US); Joseph T. Kramer, Taylor Mill, KY (US); James P. Taylor, Cincinnati, OH (US)

(73) Assignee: Autodesk, Inc., San Rafael, CA (US)

( * ) Notice: Subject to any disclaimer, the term of this patent is extended or adjusted under 35 U.S.C. 154(b) by 181 days.

(21) Appl. No.: 13/776,990

(22) Filed: Feb. 26, 2013

(65) Prior Publication Data

US 2013/0185265 A1   Jul. 18, 2013

Related U.S. Application Data

(63) Continuation of application No. 13/545,464, filed on Jul. 10, 2012, now Pat. No. 8,407,315, which is a continuation of application No. 13/444,133, filed on Apr. 11, 2012, now Pat. No. 8,244,831.

(60) Provisional application No. 61/488,979, filed on May 23, 2011.

(51) Int. Cl.
   *G06F 15/16*        (2006.01)
   *G06F 17/30*        (2006.01)
   *H04L 29/08*        (2006.01)

(52) U.S. Cl.
   CPC ...... *G06F 17/30575* (2013.01); *H04L 67/1095* (2013.01); *H04L 67/06* (2013.01)
   USPC ............ 709/217; 709/200; 709/230; 707/203

(58) Field of Classification Search
   USPC ........................... 709/200, 217, 230; 707/203
   See application file for complete search history.

(56) References Cited

U.S. PATENT DOCUMENTS

| 5,919,247 | A  | * | 7/1999  | Van Hoff et al. | 709/217 |
| 5,983,268 | A  | * | 11/1999 | Freivald et al. | 709/218 |
| 6,182,061 | B1 | * | 1/2001  | Matsuzawa et al. | 707/737 |
| 6,272,536 | B1 | * | 8/2001  | van Hoff et al. | 709/217 |
| 6,513,050 | B1 |   | 1/2003  | Williams et al. | |
| 6,516,337 | B1 | * | 2/2003  | Tripp et al. | 709/202 |
| 6,738,799 | B2 | * | 5/2004  | Dickenson | 709/203 |
| 7,228,280 | B1 | * | 6/2007  | Scherf et al. | 704/500 |
| 7,543,018 | B2 | * | 6/2009  | Appelman | 709/203 |

(Continued)

OTHER PUBLICATIONS

Dean et al. "MapReduce: Simplified Data Processing on Large Clusters". Google, Inc., OSDI, 2004. pp. 1-13.
Korn, et al. "The VCDIFF Generic Differencing and Compression Data Format". The Internet Society, Jun. 2002, printed from http://tools.ietf.org/html/rfc3284 on Jun. 7, 2012, pp. 1-30.

(Continued)

*Primary Examiner* — Anthony Mejia
(74) *Attorney, Agent, or Firm* — Fish & Richardson P.C.

(57) ABSTRACT

Data can be transferred between computers at remote sites by transferring the data itself, or by transferring files showing how data at an originating site can be recreated from data already present at a receiving site. As part of the data transfer, a determination can be made as to what is the most appropriate way for the transfer to take place. Further, in cases where data is not transferred directly between originating and receiving sites, it is possible that some preparatory steps might be performed to improve the efficiency of the transfers to the receiving sites when they do take place. Additional efficiencies can be obtained in some cases by using the parallel processing capabilities provided by a cloud based architecture.

17 Claims, 13 Drawing Sheets

(56) References Cited

U.S. PATENT DOCUMENTS

| | | | |
|---|---|---|---|
| 7,650,331 | B1 | 1/2010 | Dean et al. |
| 7,865,898 | B2* | 1/2011 | Vaidyanathan et al. ...... 718/105 |
| 7,882,064 | B2 | 2/2011 | Lee et al. |
| 8,244,831 | B1 | 8/2012 | McLennan et al. |
| 8,407,315 | B2 | 3/2013 | McLennan et al. |
| 2004/0267807 | A1* | 12/2004 | Barabas et al. ........... 707/103 R |
| 2006/0206542 | A1 | 9/2006 | Wolfgang et al. |
| 2007/0198685 | A1* | 8/2007 | Phatak ......................... 709/223 |
| 2009/0271779 | A1 | 10/2009 | Clark |
| 2010/0063966 | A1 | 3/2010 | Lemoine et al. |
| 2010/0088278 | A1 | 4/2010 | Wood et al. |
| 2010/0121854 | A1* | 5/2010 | Fischer ........................ 707/737 |
| 2010/0180128 | A1 | 7/2010 | Borden et al. |
| 2010/0293142 | A1* | 11/2010 | Ackerman et al. ............ 707/640 |
| 2010/0332682 | A1 | 12/2010 | Sharp et al. |
| 2011/0087792 | A2 | 4/2011 | Wayda et al. |
| 2012/0136962 | A1* | 5/2012 | Gardner ........................ 709/217 |

OTHER PUBLICATIONS

Olsen, M. "HADOOP: Scalable, Flexible Data Storage and Analysis". IQT Quarterly, Sprint 2010, vol. 1, No. 3. pp. 14-18.

Tridgell, A. "Efficient Algorithms for Sorting and Synchronization". Thesis, The Australian National University, Feb. 1999. pp. 1-115.

Tridgell, et al. "TR-CS-96-05: The rsync algorithm". Joint Computer Science Technical Report Series, The Australian National University, Jun. 1996. pp. 1-6.

Xdelta, open-source binary diff, differential compression tools, VCDIFF (RFC 3284) delta compression, printed from http://xdelta.org/ on Jun. 7, 2012. pp. 1-21.

Xdelta, from Wikipedia, the free encyclopedia, printed from http://en.wikipedia.org/wiki/Xdelta on Jun. 8, 2012, last modified on May 8, 2012. pp. 1-2.

International Search Report and Written Opinion in International Patent Application No. PCT/US2012/038106, filed on May 16, 2012. Received Mar. 27, 2014. 10 pages.

International Preliminary Report on Patentability in International Patent Application No. PCT/US2012/038106, filed on May 16, 2012. Received Apr. 24, 2014. 9 pages.

* cited by examiner

METHOD FOR HORIZONTAL SCALE DELTA ENCODING

CROSS REFERENCE TO RELATED APPLICATIONS

This application is related to, is a continuation of, claims priority from, and incorporates by reference the entirety of the disclosure of, U.S. non-provisional patent application Ser. No. 13/545,464, filed on Jul. 10, 2012 with the same inventors as listed above and the title "METHOD FOR THE PREEMPTIVE CREATION OF BINARY DELTA INFORMATION WITHIN A COMPUTER NETWORK", which application itself was a continuation of, and incorporated by reference in its entirety, U.S. non-provisional patent application Ser. No. 13/444,133, filed with the title "METHOD FOR THE PREEMPTIVE CREATION OF BINARY DELTA INFORMATION WITHIN A COMPUTER NETWORK" on Apr. 11, 2012, which itself claimed priority from, and incorporated by reference in its entirety, provisional patent application 61/488,979, filed with the title "METHOD FOR THE PREEMPTIVE CREATION OF BINARY DELTA INFORMATION WITHIN A COMPUTER NETWORK" on May 23, 2011.

FIELD

The technology disclosed herein can be applied to the replication of data between remote computer systems. In certain preferred embodiments of the disclosed technology, this replication involves the preemptive creation of binary delta information within a computer network.

BACKGROUND

For modern businesses, it is often critical that widely scattered locations be able to work from a common set of data. For example, if a company has design teams in multiple locations working on a new product or process, it is necessary for each design team to have up to date versions of the documents for the new products or processes, so that they can see any changes that other design teams have made. One approach to handling this requirement is to establish point to point connections between each of the remote locations. In this approach, whenever a designer at one location makes a change, the changed document can be sent to all of the other locations through their dedicated connections. However, the number of connections (and therefore cost) required to maintain and use this type of network increases very quickly as a function of the number of remote locations. Similarly, the bandwidth required to send each changed file to each of the remote locations can be significant. Other approaches, such as maintaining central document repositories, have been tried, but these approaches have also been found to be problematic, typically due to high bandwidth consumption. Accordingly, prior to the development of the inventors' technology, there has been a need in the art for improved technology which can effectively replicate data between remote sites.

SUMMARY

Disclosed herein are techniques which can be used in a variety of settings, including replication of data between remote sites. Based on the disclosure of this document, one of ordinary skill in the art could, without undue experimentation, implement a machine comprising a computer configured to provide a remote system with signatures corresponding to local files, and a set of updates for a set of files to be updated. Such a machine could also include the remote system, which could itself comprise a memory and a processor, and could be configured to identify the set of files to be updated based on comparing the signatures provided by the computer with a set of signatures corresponding to a set of preexisting base files. The remote system could also be configured to request updates for each file comprised by the set of files to be updated. The computer could be configured to generate the set of updates based on instructions stored in a non-transitory computer readable medium and operable to configure to generate difference packages indicating how one or more files from the set of files local to the computer can be derived from preexisting base files.

Of course, other machines, as well as methods and articles of manufacture could also be implemented based on the disclosure set forth herein. Accordingly, the summary set forth above should be understood as illustrative only of how some aspects of the inventors' technology could be implemented, and should not be treated as limiting on the protection accorded by this document, or by any related document.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

The inventors have conceived of novel technology which, for the purpose of illustration, is disclosed herein as applied to the context of replicating data between remote sites. While the application of the inventors' technology in that context satisfies a long-felt but unmet need in the art, the disclosure of the inventors' technology in that context should not be treated as implying limitations on potential fields where aspects of the inventors' technology can be beneficially applied. Accordingly, the disclosure set forth herein should be understood as being illustrative only, and not limiting.

Figure 1:
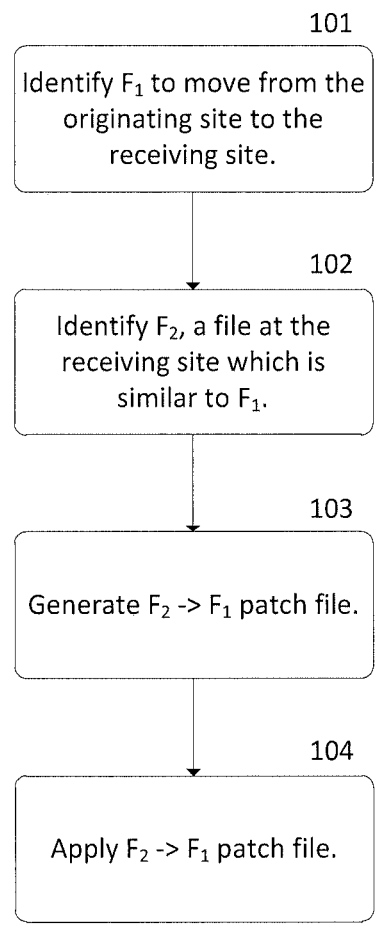
FIG. 1 illustrates a high level method which could be implemented based on this disclosure and used to transfer data from an originating site to a receiving site.

Turning now to the figures, FIG. 1 illustrates a high level method which could be implemented based on this disclosure and used to transfer data from an originating site to a receiving site. Initially, in the method of FIG. 1, a file $F_1$, which needs to be moved from the originating site to the receiving site, is identified [101]. Once the file is identified, a corresponding file, $F_2$, which is similar to file $F_1$, is identified at the receiving site [102]. After the file that needs to be moved and the corresponding file at the receiving site have been identified, the method of FIG. 1 continues by generating a file which can be used to obtain $F_1$ from $F_2$, referred to in FIG. 1 as the $F_2 \rightarrow F_1$ patch file [103]. Finally, the $F_2 \rightarrow F_1$ patch file is applied [104], thereby creating a new copy of $F_1$ based on the information which was already present at the receiving site. In this way, the receiving site can obtain a copy of the file to be transferred, $F_1$, without the file itself being transferred, potentially significantly decreasing the amount of bandwidth necessary to replicate the subject file at the originating and receiving sites.

It should be understood that, in embodiments where they are performed, steps such as depicted in FIG. 1 could be performed in a variety of ways. As an illustration of this, consider the diagram of FIG. 2, which shows a process in which computers at the originating site and receiving site interact to identify the file or files to be transferred. In that process, the interaction starts with a computer at the originating site polling a computer at the receiving site to see if there are any requests [201]. While a computer at the receiving site may not always have a request, in the process of FIG. 2, this polling results in the computer at the receiving site sending the computer at the originating site a request for a list [202].

The computer at the originating site would respond to this request by creating a list of files which might need to be sent to the receiving site, as well as signatures for those files [203]. For example, in the case where the originating and receiving sites are remote locations where different teams are collaborating on the design of a product, the list of files and signatures could be created by scanning a directory where design information is stored, listing the name and/or path for each file in the directory, and, along with the names of the files in the directory, also list a signature generated by running the files through a strong hashing algorithm (e.g., MD5, SHA-1, etc). Alternative approaches are also possible. For example, the computer at the originating site might be configured to monitor the files in the relevant location(s) (e.g., design directory), and to note when those files are modified or created. Then, when the list request is received, the computer could simply check which files had been created or modified since the last time data had been sent to the receiving site, and create the signatures for only those files. Additional variations, such as where the originating site might also indicate files which had been deleted, might create other types of signatures (e.g., checksums rather than hash values), or might create signatures in advance of the communications with the receiving site are also possible and may be included in specific embodiments depending on the context in which such embodiments are deployed and used.

Figure 2:
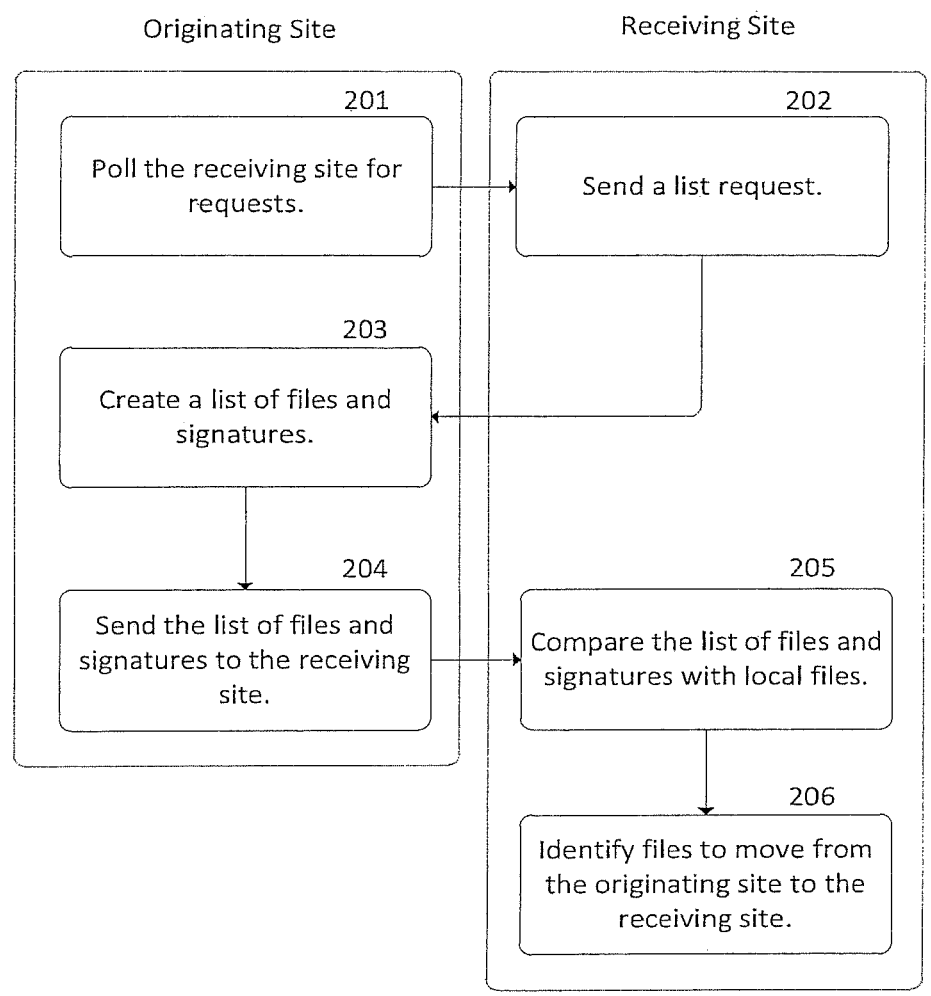
FIG. 2 illustrates a process in which computers at an originating site and a receiving site interact to identify the file or files to be transferred.

Returning now to the process of FIG. 2, once the list of files and signatures has been created [203], that list would be sent back to the receiving site [204]. A computer at the receiving site could then compare the list with the files it had in the relevant location (e.g., a corresponding design directory) and their signatures [205]. For any files on the list that were not present at the receiving location (e.g., as indicated by having signatures that do not match any of the signatures of the files at the receiving location), those files could be identified as files to move from the originating site to the receiving site (e.g., by adding them to a list of files created at the receiving site which would later be sent to the originating site). Modifications to deal with changes that might not be reflected in signatures are also possible. For example, in the event a file is deleted at the originating site, the receiving site could detect that deletion (e.g., by being provided with a list of deleted files, or by identifying a file stored at the receiving location for which there was not a file with a matching name at the originating location) and, in some embodiments, might delete the corresponding file at the receiving site in order to maintain synchronization between sites.

Other variations are also possible. For example, instead of transmitting lists of files, a computer at an originating site could send filenames and signatures individually, waiting until it had received an indication of whether a file should be transmitted to the receiving site before sending the next filename/signature combination to be processed. Similarly, in some implementations, instead of a method such as shown in FIG. 2 being initiated with a polling request, a computer at an originating site could be programmed to notify a receiving site whenever a file is created or modified, and the computer at the receiving site could then decide whether to request it be transferred at that time, or to wait and schedule a transfer in the future. It is also possible that a computer at a receiving site could be programmed to poll the originating site, such as by sending periodic messages asking the originating site for lists of files that might need to be (or do need to be, depending on the implementation) transferred.

As a further type of variation, in some implementations, transference of files could be triggered by some kind of human input. For example, in some instances, computers at either the originating or receiving sites could be programmed to provide an interface to administrator or other user which would allow the administrator or other user to indicate that some or all files at the originating site should be synchronized at the receiving site. Similarly, in some implementations, an administrator or other user at the originating site could be provided with an interface which would allow him or her to immediately send a particular file (or files) to the receiving site, or an administrator or other user at the receiving site could be provided with an interface which would allow him or her to immediately verify that a file at the receiving site was the same as an equivalent file at the originating site, or to request that such file be immediately synchronized between sites. This could be useful, for example, in cases where individuals at the originating and receiving sites are working on a project which requires a single file to be edited at both sites, and the individuals editing the file would like to make sure that they have the most up to date version of the file before making any changes.

Variations on how actual transfers take place are possible as well. For example, in some cases, a computer at one site could provide information to a computer at another side by simply sending that information over a network. However, in other implementations, information might be provided using a more complicated procedure. For example, a computer at the site where the information originates could send a message to a computer at the receiving site informing the computer at the receiving site that the information could be accessed at a specified network location (e.g., a download location indicated by a URL or numeric IP address). The computer at the receiving site could then establish a connection with the specified network location to obtain the information. Using this type of procedure can increase the security of information transfer, as the sending computer can set up the specified network location to only be accessible for a small amount of time (e.g., 30 seconds after the message is sent to the computer at the receiving site), and could also perform other types of checks to make sure that access to the information is limited to the intended computer (e.g., checking the address information included in the network packages used to establish the connection with the specified remote site). Additional variations will be immediately apparent to those of ordinary skill in the art in light of this disclosure. Accordingly, the discussion of how the file or files to be transferred could be identified, as well as the associated process of FIG. 2, should be understood as being illustrative only, and not limiting.

Figure 3:
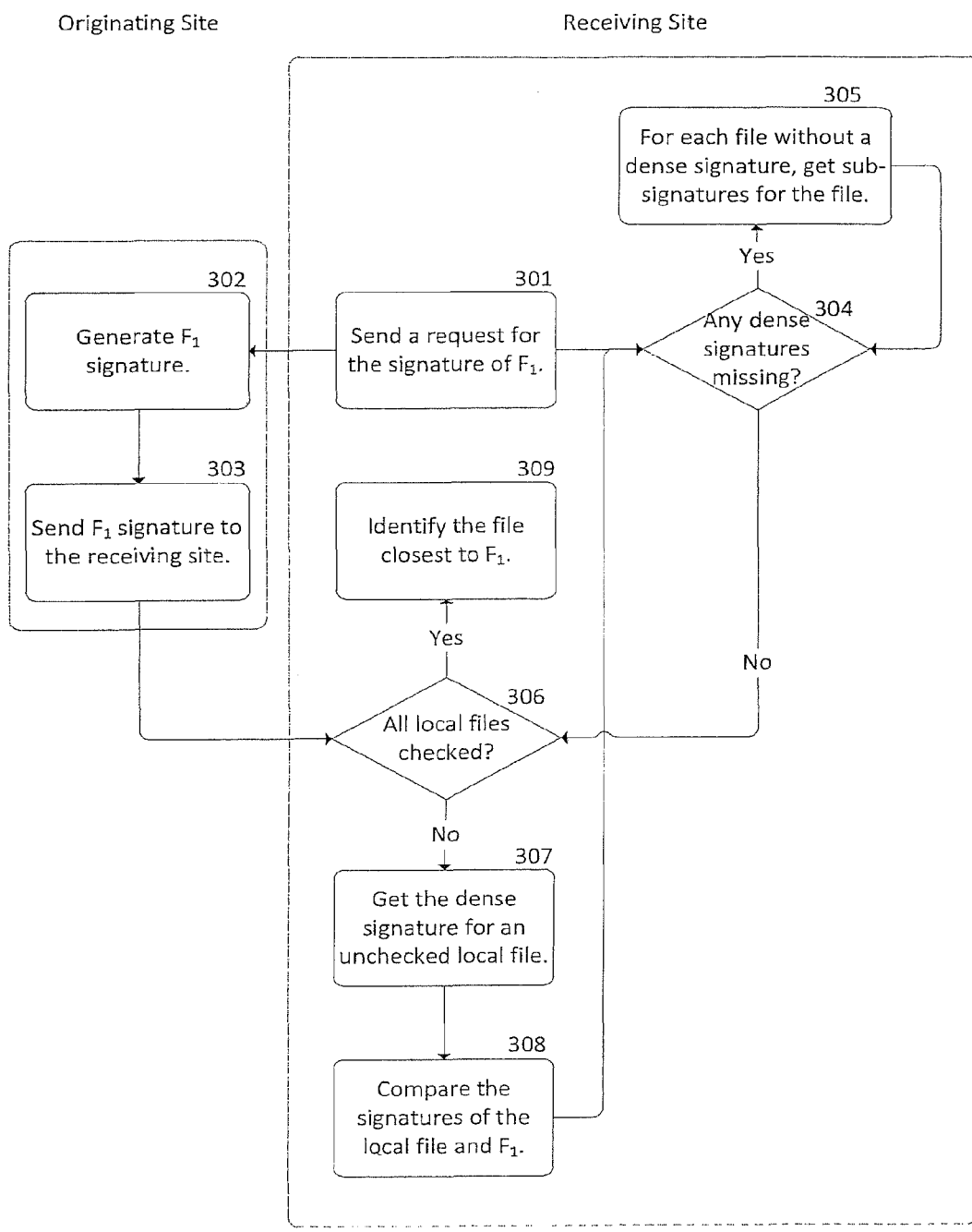
FIG. 3 illustrates a process which could be performed in identifying a file at a receiving site which is similar to a file at the originating site which needs to be transferred.

Moving on from the discussion of FIG. 2, FIG. 3 illustrates a process which could be performed in identifying a file at the receiving site ($F_2$) which is similar to a file at the originating site which needs to be transferred ($F_1$) [102]. Initially, in the process of FIG. 3, a computer at the receiving site sends a request for a signature of $F_1$ [301]. The transmission of this request results in the computer at the originating site generating the signature of $F_1$ (e.g., by running $F_1$ or parts of $F_1$ through a strong hashing function, generating one or more checksums for $F_1$, etc) [302] and sending that signature to the receiving site [303]. Additionally, at the same time as it transmits the request for the signature of $F_1$ [301], the computer at the receiving site runs a check to see if all of the local files which may be identified as similar to $F_1$ have dense signatures (e.g., a signature for a file made up of sub-signatures corresponding to parts of the file) [304]. If any of the local files do not have dense signatures (e.g., because dense signatures for those files have not yet been created), then for each local file with a missing dense signature, a dense signature is created by calculating sub-signatures corresponding to the parts of the file [305]. This could be achieved, for example, by, for each byte in a file, running the following 2K bytes in the file (or, for bytes less than 2K bytes from the end of the file, the remainder of the file) through a strong hashing algorithm (e.g., MD5, SHA-1, etc).

Variations on this approach to creating dense signatures are also possible. For example, instead of using a strong hashing algorithm, in some embodiments sub-signatures for the individual bytes in a file could be created by making checksums (e.g., by summing the 2K bytes following each byte, then squaring the sum and modding it by a 16 bit prime number). Similarly, instead of making sub-signatures corresponding to each byte, dense signatures could be made up of sub-signatures corresponding to larger portions of a file. It should be understood that the use of the following 2K bytes in a file to create a sub-signature is also not intended to be treated as a required characteristics of the inventors' technology, and that different amounts of trailing (or preceding) data (including no trailing or preceding data) could be used in creating sub-signatures. In general, in embodiments which use a process such as shown in FIG. 3, the nature of the signatures will be a function of the requirements for the specific embodiment, and will often involve tradeoffs in terms of space, bandwidth, and accuracy (e.g., the more unique and larger the number of sub-signatures, the greater the amount of space that would be used to store them, or the amount of bandwidth which would be used in transferring them across a network). Accordingly, the discussion above of creating dense signatures, as well as the other associated steps of FIG. 3, should be understood as being illustrative only, and not limiting.

Once the dense signatures are available for all of the files at the receiving site, the actual comparison to identify the file that will be used in generating the $F_2 \rightarrow F_1$ patch [103] can commence. While this can take place in a variety of manners, in the process of FIG. 3, it begins with a test of whether all the files at the receiving site have been checked to determine their similarity with $F_1$ [306]. If the answer to this question is no, then the computer at the receiving site retrieves the dense signature for a file which has not been checked [307], and proceeds to check it against the signature for $F_1$ [308]. To illustrate how this checking might take place, consider a case where $F_1$ is an 8K file and the signature of $F_1$ is generated [302] by concatenating a first sub-signature corresponding to the first 2K bytes in the file (e.g., a hash of the first 2K bytes in the file), a second sub-signature corresponding to the second 2K bytes in the file, a third sub-signature corresponding to the third 2K bytes in the file, and a fourth sub-signature corresponding to the fourth 2K bytes in the file. In such a case, to check how similar a file at the receiving site (referred to in this example as $F_x$) is to $F_1$, each of the sub-signatures in the dense signature of $F_x$ would be compared against each of the sub-signatures in the signature of $F_1$. Every time one of the sub-signatures in the dense signature of $F_x$ matches one of the sub-signatures in the signature of $F_1$, a counter representing the similarity between $F_1$ and $F_x$ could be incremented. Finally, when the dense signatures for all of the files had been compared against the signature of $F_1$, the file with the highest counter (i.e., the counter incremented the most times) could be identified as the file closest to $F_1$ [309].

As is the case with identifying a file to move from an originating site to a receiving site, there are many possible variations which could be implemented in identifying a file at the receiving site which is similar to a file to be moved. For example, the discussion above illustrated a case where the signatures for files at the receiving site had much greater density than the signature for the file to be transferred (i.e., the files at the receiving site had sub-signatures corresponding to individual bytes, while the file to be transferred had sub-signatures corresponding to non-overlapping 2K blocks). However, in some implementations that relationship could be altered with the signature for the file to be transferred (i.e., $F_1$) having a greater density than (or equal density to) the signatures for the files at the receiving site. Further, in some cases, multiple types of signatures might be used in comparing the file to be transferred with the files at the receiving site. For example, in some implementations, there might be an initial comparison made with a first type of signature (e.g., a checksum) and, if that first comparison indicated a possible match, a second comparison could be made with a second type of signature (e.g., a hash value). In this way, a relatively computationally inexpensive comparison could be used as a filter before applying a stronger type of test (and, potentially, before even generating the signatures that would be used in such a test).

Other variations, such as where similar files are identified based on information other than the types of signatures described in the context of FIG. 3, are also possible. To illustrate, consider a case where a computer at the receiving site is configured to maintain a directory structure which is identical to the directory structure maintained at the originating site. In such a case, when a file to be transferred from the originating site is identified [101], a computer at the receiving site could simply check if it has a local file which is identified by the same directory path and filename as the file to be transferred. If such a local file exists, then the computer at the receiving site could be configured to identify that file as the similar file, and not perform any additional calculations such as would be associated with a method like that depicted in FIG. 3. Similarly, in many cases, the originating sites and the receiving sites will use some kind of document management system that tracks relationships between versions of files. In such a case, if the document management system of the originating site indicates that $F_1$ is a new version of a file located at the receiving site (e.g., as determined by metadata sent to the receiving site during the process of identifying $F_1$), then the most recent version of the file at the receiving site can be identified as the similar file, even though the filename and path of $F_1$ may not match the filename and path of any file at the receiving site. Accordingly, as was the case with the discussion of how to identify a file to be moved set forth in the context of FIG. 2, the discussion of how to identify a similar file set forth in the context of FIG. 3 should be understood as being illustrative only, and not limiting.

Figure 4A:
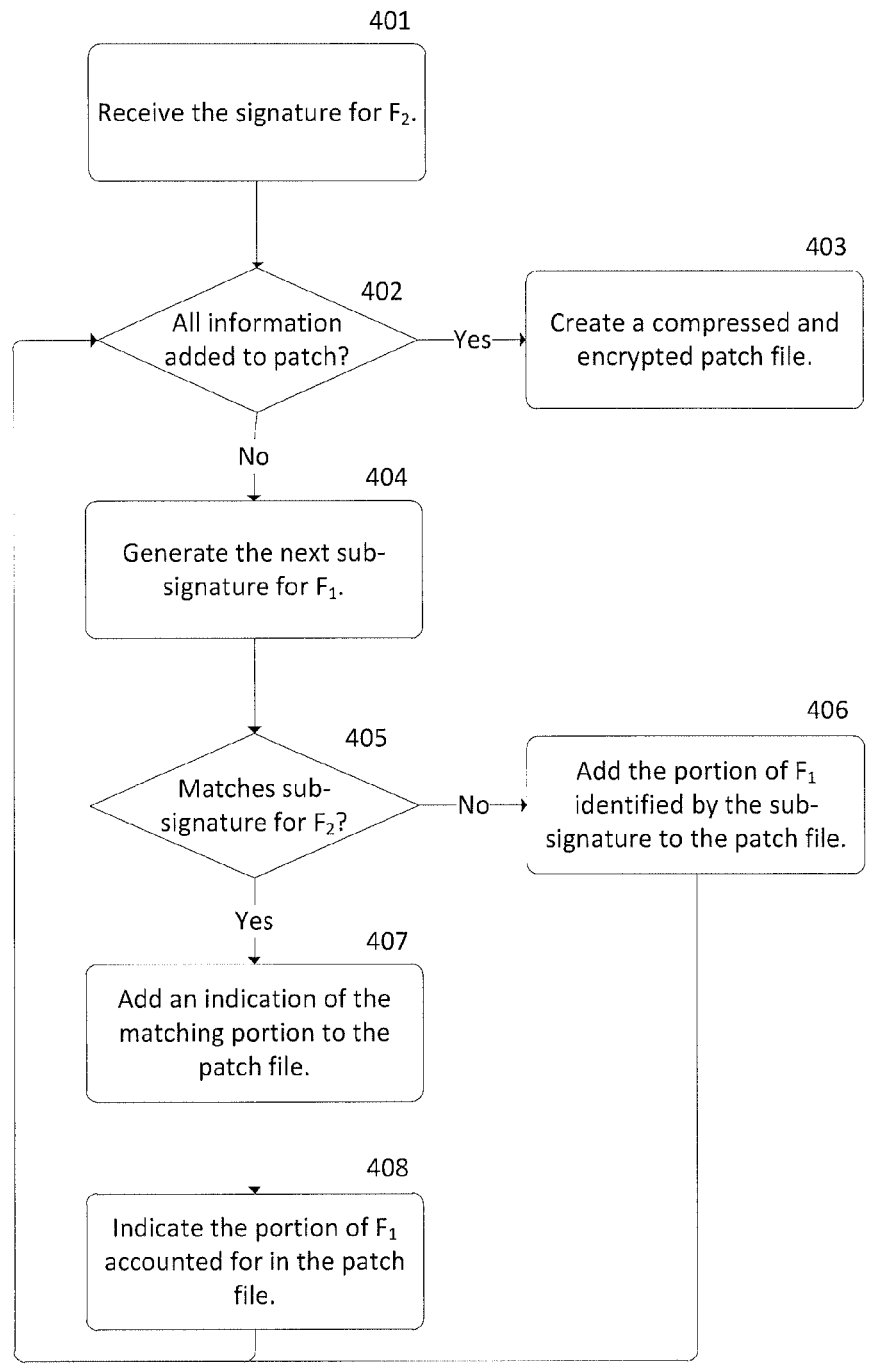
FIGS. 4a-4b illustrate processes that can be used to generate a file that can be used to derive a file to be transferred from a base file at a receiving site.

Moving on from the discussion of FIG. 3, FIG. 4a illustrates a process which can be used to generate a file that can be used to derive the file to be transferred given the similar file at the receiving site (e.g., the $F_2 \rightarrow F_1$ patch file) [103]. Initially, in FIG. 4a, the computer that will create the patch file receives the signature for $F_2$ [401]. In a preferred embodiment this computer will be a computer at the originating site, and so will already have a copy of $F_1$ (or the appropriate signatures for $F_1$, depending on the implementation). However, in the event that the information regarding $F_1$ which is necessary to create the patch file is not already present, that information can also be received at this initial phase in the process. Once the necessary information has been received, the process of FIG. 4a continues by checking if all of the information in $F_1$ has been added to the patch [402]. If the answer to this question is yes, then the patch file will be created by compressing and encrypting the information which had been identified as necessary to obtain $F_1$ from $F_2$ [403].

Otherwise, if not all information in $F_1$ has been added to the patch, the process of FIG. 4a would generate the next sub-signature of $F_1$ to be used in creating the patch [404]. For example, a computer executing the process of FIG. 4a could look to the next byte in $F_1$ which has not been added to the patch, (if this was the first iteration, this would be the first byte in $F_1$), and generate a sub-signature for that byte (e.g., by applying a hashing algorithm to the next 2K bytes in $F_1$). This sub-signature would then be checked to see if it matches any of the sub-signatures for $F_2$ [405]. If there is not a match, then the portion of $F_1$ identified by the non-matching sub-signature (e.g., the byte at the beginning of the 2K bytes run through a hashing algorithm) would be added [406]. Otherwise, if there is a match, an indication of the portion of $F_2$ which corresponds to the matching sub-signature would be added to the patch file [407], and data stored in the computer creating the patch file (e.g., a counter) would be modified to indicate that the corresponding portion of $F_1$ was accounted for in the patch [408]. The process would then loop back to check if all of the information from $F_1$ added to the patch [402] and would then end with the creation of the patch file [403] or continue to add more data as described above.

To provide a concrete illustration of how this process might take place, consider a situation in which $F_2$ is a file of 8K bytes, the signature of $F_2$ is made up of four sub-signatures formed by hashing four consecutive, non-overlapping 2K byte blocks in that file, and the process of FIG. 4a is performed by a computer at the originating site. Also, for the purpose of this illustration, assume that $F_1$ is a new version of $F_2$ which differs from $F_2$ in that two new bytes have been added at the end of the first block of $F_2$. In such a case, after receiving the signature file for $F_2$ [401], the computer will check if a patch had been created that could be used to recreate $F_1$ from $F_2$ [402]. Since this is the first iteration of the process of FIG. 4a, the answer to this question will be no, and so the computer will calculate a hash value for the first 2K bytes of $F_1$ [404]. This hash value will then be compared with the four hash values in the signature of $F_2$ [405] and, since the first change in $F_1$ was not made until after the first block in $F_2$, the first block in the signature of $F_2$ will be identified as a match. Accordingly, data will be added to the patch file (currently in only an intermediate state) indicating that the process of recreating $F_1$ from $F_2$ can start by copying the first 2K bytes of $F_2$ into the recreation of $F_1$ [407]. The data stored by the computer at the originating site will then be modified to indicate that the first 2K bytes of $F_1$ have been accounted for [408], and that computer will check to see if there is anything more that needs to be added to the patch file [402].

On its second iteration, the process would start by generating the hash value for the 2K bytes of $F_1$ starting with byte 2K+1 from that file [404]. However, because $F_1$ differs from $F_2$ in that two new bytes have been added after the end of the first block of $F_2$, this new hash value will not match any of the hash values from the signature of $F_2$. Accordingly, instead of adding an indication of a matching block to the patch file [407], in this iteration, the patch file will be modified to state that, after adding the first block from $F_2$, the next thing to be added to the recreated version of $F_1$ should be the data in byte 2K+1 [406]. A similar sequence of events will take place on the next iteration, except that, instead of modifying the patch file to say that the data from byte 2K+1 should be added, on the third iteration, the patch file will be modified to state that the data from byte 2K+2 should be added. As a result, in this example, after three iterations of the process of FIG. 4a, an intermediate patch file will have been created with information such as the following:

TABLE 1

Exemplary intermediate patch file.

To recreate $F_1$ from $F_2$:
1: copy the first 2K bytes from $F_2$ into the new copy of $F_1$
2: copy <data from byte 2K + 1> into the new copy of $F_1$
3: copy <data from byte 2K + 2> into the new copy of $F_1$ For the fourth iteration, after determining that additional data needs to be added to the patch file [402], the process would generate a hash value based on the 2K bytes starting with byte 2K+3 in $F_1$ [404]. Because the only change in $F_1$ was the insertion of the bytes in positions 2K+1 and 2K+2, this new hash value would be matched against the second hash in the signature of $F_2$ and the patch file would be modified to state that the process of recreating $F_1$ from $F_2$ could continue by copying the second 2K bytes from $F_2$ into $F_1$ [407]. A similar process would take place for the remaining 4K bytes of $F_1$, leading to an intermediate file containing the following information:

TABLE 2

Exemplary intermediate patch file.

To recreate $F_1$ from $F_2$:
1: copy the first 2K bytes from $F_2$ into the new copy of $F_1$
2: copy <data from byte 2K + 1> into the new copy of $F_1$
3: copy <data from byte 2K + 2> into the new copy of $F_1$
4: copy the second 2K bytes from $F_2$ into the new copy of $F_1$
5: copy the third 2K bytes from $F_2$ into the new copy of $F_1$
6: copy the fourth 2K bytes from $F_2$ into the new copy of $F_1$ This intermediate file would then be compressed, such as by consolidating steps (e.g., combining steps 2-3 into a single step adding two bytes of data, and combining steps 4-6 into a single step indicating the copying of 6K bytes of data), modifying the data that was present into a more compressed form (e.g., translating human readable data into denser machine code), or performing other operations that might be appropriate in a particular implementation. Further, depending on the implementation, the data might also be encrypted, such as if the data being transmitted was sensitive medical, financial, technical or business data. Finally, once any processing on the intermediate patch file was complete, the finished patch file would be created [403], and would be ready to be sent to the receiving site.

As was the case with the processes discussed in the context of FIGS. 2 and 3, the process of generating a patch file can be implemented in many different manners, and should not be restricted to those discussed above in the context of FIG. 4a. As an illustration of this, consider how the process of creating a patch file could be structured to account for the possibility of a change within the portions of the files used for creating signatures in the previous example. For instance, if $F_1$ differed from $F_2$ only in that a single byte had been added to $F_1$ between the bytes at positions 1K and 1K+1 in $F_2$, it is possible that an approach which used sub-signatures based on static 2K portions of the files would fail to identify any matches between $F_1$ and $F_2$ until it had individually inserted the first 2K+1 bytes of $F_1$ into the patch file. To avoid this, some implementations might support approaches which dynamically vary the amount of data used in comparisons, starting with larger amounts of data and working down so as to catch similarities between $F_1$ and $F_2$ which might be missed using static amounts of trailing or preceding data. An example of such an approach is set forth in FIG. 4b, which shows a process such as depicted in FIG. 4a which has been modified to check if a comparison between $F_1$ and $F_2$ which revealed no matches was made at the greatest possible resolution [409] (i.e., made using signatures based on the smallest supported amount of data). If not, then the process could continue by generating a new sub-signature for $F_1$ [404] using a smaller amount of data, and checking if that new sub-signature matches any of the sub-signatures for $F_2$ [405], thereby potentially discovering matches which might have been missed using the sub-signatures based on the larger amounts of data.

Figure 4B:
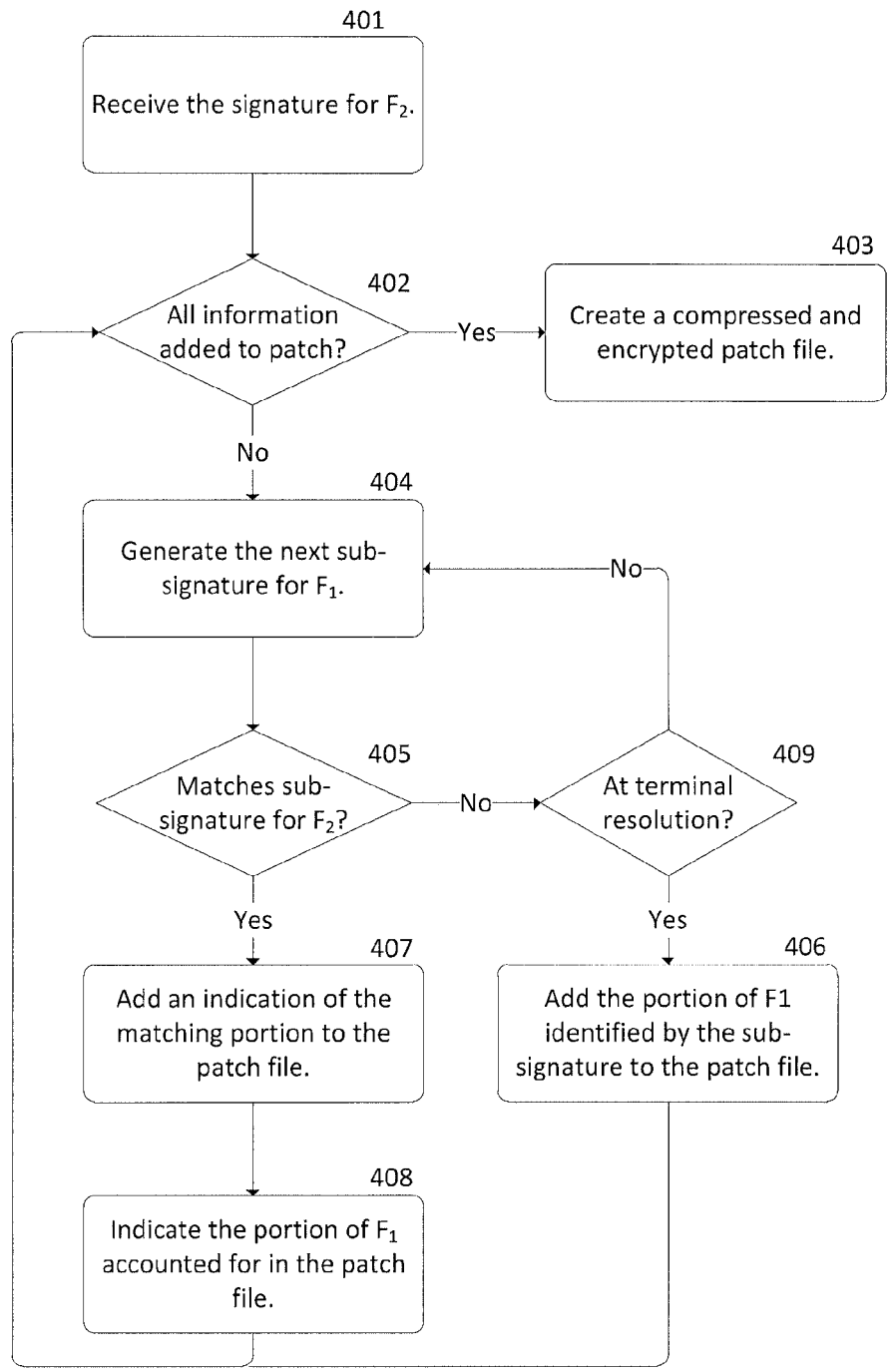

As a concrete example of how a dynamic resizing approach such as illustrated in FIG. 4b could be applied, consider a case where $F_2$ is a file of 8K bytes, and $F_1$ is a file of 8K+1 bytes which differs from $F_2$ only in that a single new byte inserted between the bytes at positions 1K and 1K+1. In such a case, to support dynamic resizing, the signature for $F_2$ received at the start of the process [401] could be made up of three sets of sub-signatures, each set having sub-signatures based on portions of $F_2$ which are half the size of the portions for the previous sub-set. That is, the signature of $F_2$ could be made up of a first set of two sub-signatures generated by running the two non-overlapping 4K byte blocks of $F_2$ through a strong hashing function, a second set of four sub-signatures generated by running the four non-overlapping 2K byte blocks of $F_2$ through a strong hashing function, and a third set of eight sub-signatures generated by running the eight non-overlapping 1K byte blocks of $F_2$ through a strong hashing function.

Using a signature made up of these sub-signatures, on the first iteration of the process of FIG. 4b, the step of generating the next sub-signature for $F_1$ [404] could be performed by running the first 4K bytes of $F_1$ through a strong hashing function. Once this sub-signature had been generated, it could be compared [405] against the sub-signatures generated by running 4K portions of $F_2$ through the hashing function. Since, in this example, $F_1$ differs from $F_2$ in that a new byte had been added between bytes 1K and 1K+1, the signature for the first 4K bytes of $F_1$ would not match either of the sub-signatures corresponding to the non-overlapping 4K blocks of $F_2$. As a result, the process of FIG. 4b would check whether the comparison had been made at the greatest possible resolution [409]. Since the answer to this question is no, the process of FIG. 4b would loop back and generate the next sub-signature for $F_1$ [404] by running the first 2K bytes of $F_1$ through the strong hashing function. This signature would then be compared to the sub-signatures based on 2K portions of $F_2$ [405] and, since the new byte in $F_1$ was located at position 1K+1, no match would be found. This would be followed by a check if the comparison was made at the greatest resolution [490] and, and the process looping back to generating the next sub-signature for $F_1$ [404].

On the third iteration of the process of FIG. 4b, the next sub-signature for $F_1$ would be generated [404] by running the first 1K bytes of $F_1$ through the strong hashing function. Because the only difference between files $F_1$ and $F_2$ in this example occurs at position 1K+1, when this newest sub-signature is compared against the 1K sub-signatures from $F_2$ [405], a match will be found with the sub-signature generated by running the first 1K bytes of $F_2$ through the hashing function. The patch file will then be updated [407] to indicate that the first 1K bytes of $F_2$ should be copied to a new version of $F_1$ created based on $F_2$, and the data maintained by the computer performing the process of FIG. 4b will be updated to indicate that the first 1K bytes of $F_1$ have been accounted for. The process of FIG. 4b will then check if all information has been added to the patch [402]. Since only the first 1K bytes of $F_1$ have been added, this check will reveal that more information should be added, and the process will iterate an additional (i.e., fourth) time starting by generating the next sub-signature for $F_1$ [404].

Because $F_1$ and $F_2$ differ from one another based on a new byte that has been added to $F_1$ at position 1K+1, this sub-signature for the fourth iteration, which can be generated by running the 4K bytes of $F_1$ starting with the byte at position 1K+1 through the hashing function, will not match any of the sub-signatures from the appropriate set of sub-signatures for $F_2$. Similarly, the sub-signatures for the fifth iteration (generated by hashing the 2K bytes of $F_1$ starting with the byte at position 1K+1) and the sixth iteration (generated by hashing the 1K bytes of $F_1$ starting with the byte at position 1K+1) would also fail to match any of the sub-signatures from the appropriate set in $F_2$. Accordingly, after the sixth iteration's check for whether there was a match between the sub-signature of $F_1$ and a sub-signature in $F_2$ [405], the process would check if the comparison had been made at the greatest possible resolution [409] and, since, in this example, the signature for $F_2$ did not include any sub-signatures based on portions of $F_2$ smaller than 1K and would find that the greatest resolution for the comparison had been reached at that iteration. As a result, the portion of $F_1$ identified by the sub-signature (i.e., the byte at position 1K+1) would be added to the patch file [406], resulting in an intermediate patch file including information such as set forth in table 3:

TABLE 3

Exemplary intermediate patch file.

To recreate $F_1$ from $F_2$:
1: copy the first 1K bytes from F2 into the new copy of $F_1$
2: copy <data from byte 1K + 1> into the new copy of $F_1$ After the data from byte 1K+1 of $F_1$ had been added to the patch file, the process of FIG. 4b would check if all information had been added to the patch [402] and, since it had not, the process of FIG. 4b would continue to iterate. On the first two of these continued iterations (i.e., the $7^{th}$ and $8^{th}$ iterations), no match would be found, because the values obtained by hashing the 4K bytes of $F_1$ starting at position 1K+2 would not match the sub-signature for either the first or second 4K bytes of $F_2$, and because the values obtained by hashing the 2K bytes of $F_1$ starting at position 1K+2 would not match the sub-signatures for any of the non-overlapping 2K portions of $F_2$. However, on the third of these continued iterations (i.e., the $9^{th}$ iteration), a match would be found, because the value obtained by hashing the 1K bytes of $F_1$ starting with position 1K+2 would match the value obtained by hashing the 1K bytes of $F_2$ starting at position 1K+1. As a result, the patch file would be updated [407] to indicate that the second 1K bytes of $F_2$ should be copied into the new version of $F_1$. Similar comparisons and modifications would take place on the $10^{th}$ iteration (no match between the sub-signature of the 4K bytes of $F_1$ starting at byte 2K+2 and a sub-signature for $F_2$), the $11^{th}$ iteration (match between the sub-signature of the 2K bytes of $F_1$ starting at byte 2K+2 and the sub-signature for the 2K bytes of $F_2$ starting at byte 2K+1), and the $12^{th}$ iteration (match between the sub-signature for the 4K bytes of $F_1$ starting at byte 4K+2 and the sub-signature for the 4K bytes of $F_2$ starting at byte 4K+1). The result would be a patch file which would (before final processing such as compression and encryption) include information such as the following:

TABLE 4

Exemplary intermediate patch file.

To recreate $F_1$ from $F_2$:
1: copy the first 1K bytes from $F_2$ into the new copy of $F_1$
2: copy <data from byte 1K + 1> into the new copy of $F_1$
3: copy the second 1K bytes from $F_2$ into the new copy of $F_1$
4: copy the second 2K bytes from $F_2$ into the new copy of $F_1$
5: copy the second 4K bytes from $F_2$ into the new copy of $F_1$ By contrast, if a patch file to derive $F_1$ from $F_2$ created using signatures based on static 2K portions of $F_1$ and $F_2$ would both be much larger, and require many additional steps, such as shown below in table 5:

TABLE 5

Exemplary intermediate patch file.

To recreate $F_1$ from $F_2$:
1: copy <data from byte 1> into the new copy $F_1$
2: copy <data from byte 2> into the new copy $F_1$
3: copy <data from byte 3> into the new copy $F_1$
4: copy <data from byte 4> into the new copy $F_1$
...
1999: copy <data from byte 1999> into the new copy of $F_1$
2000: copy <data from byte 2000> into the new copy of $F_1$
2001: copy <data from byte 2001> into the new copy of $F_1$
2002: copy the second 2K bytes from $F_2$ into the new copy of $F_1$
2003: copy the third 2K bytes from $F_2$ into the new copy of $F_1$
2004: copy the fourth 2K bytes from $F_2$ into the new copy of $F_1$ Additionally, even after steps 1-2001 in the table above were combined into a single step, a patch file based on the information in table 5 would be much larger than a patch file based on the information in table 4, because the patch file based on the information in table 5 would need to include the actual data from the first 2K+1 bytes of $F_1$. By contrast, the only data from $F_1$ which would be included in a patch file based on table 4 would be the data at byte 1K+1 which was found in $F_1$ but not in $F_2$. Accordingly, in implementations where it is supported, dynamic resizing can potentially provide substantial improvements over what would otherwise be possible.

It should be understood that, like the concrete example of how a patch file could be created using the process of FIG. 4a, the concrete example set forth above of how a patch file could be created using the dynamic resizing process of FIG. 4b is intended to be illustrative only, and that many variations on that process are possible. For example, in some implementations, a signature for $F_2$ might include different numbers of levels of sub-signatures, ether because $F_2$ is larger (or smaller) than 8K (e.g., if $F_2$ was a 16K file, there could be levels based on 8K, 4K, 2K and 1K blocks), because the terminal resolution for the signatures is less than 1K (e.g., the signatures for the sub-set based on the smallest portions of data could be based on sections of $F_2$ which are 0.5K or smaller), or because the levels are divided differently (e.g., each level could have three times more sub-signatures than the preceding sub-level). As another example of a potential variation, in some implementations, the $F_2 \rightarrow F_1$ patch might be not require all of the signatures for $F_2$ to be provided at the outset (e.g., if the computer generating the patch file was configured to request appropriate sub-signatures at the time they were needed).

The approach to choosing which portions of $F_1$ to use for generating sub signatures [404] could also be varied. For example, instead of returning to generating sub-signatures at the coarsest resolution (4K, in the discussion above), in some implementations, a process such as shown in FIG. 4b could be implemented so that, after information has been added to a patch file, the generation of further sub-signatures will start with the smallest resolution, and would move to coarser resolutions as amounts of data from $F_2$ corresponding to those coarser resolutions are added to the patch file. If this approach were applied in the concrete example of dynamic resizing set forth above, the result would be, after the patch file had been updated with an indication that the first 1K bytes of $F_2$ should be added to the new copy of $F_1$, the next sub-signature to be checked would be based on a hash value for the following 1K bytes of $F_1$, rather than the following 4K bytes as described. The system would continue checking using sub-signatures based on hashes of 1K blocks of $F_1$ until the patch file had been updated with an indication that an additional 1K block from $F_2$ should be added to the new copy of $F_1$. Once this second indication had been added, the system could return to checking using sub-signatures based on hashes of 2K blocks from $F_2$, and, once the patch file had been updated to indicate that an additional 2K from $F_2$ should be added to the new version of $F_1$ (either from two instructions to add 1K from $F_2$, or one instruction to add 2K from $F_2$), then the process could proceed with sub-signatures based on 4K blocks. Additional variations, such as variations which track an optimum block size for particular files or file types, then use that size as a default when generating signatures are also possible, and will be immediately apparent to those of ordinary skill in the art based on the requirements of a particular implementation and the material disclosed herein.

Of course, variations on the areas where the process of FIG. 4b differs from the process of FIG. 4a are not the only possible variations in creating a patch file. Instead, aspects of the process of creating a patch file which are common to FIGS. 4a and 4b could also be varied. For example, rather than calculating sub-signatures for $F_1$ as part of creating the patch file, in some implementations those values will have been created and stored in advance, such as during a preceding step of creating a signature for $F_1$. Similarly, in some cases, rather than using a signature of $F_2$ made up of hashes of non-overlapping blocks, the signature of $F_2$ used in processes such as shown in FIGS. 4a and 4b could have varying densities, such as having a hash for each byte in the file, having a hash for every n$^{th}$ byte in the file, or having some other type of density. Variations on how the signatures are created (e.g., using checksums rather than hashes), the format used in patch files, and the size of blocks used in creating sub-signatures relative to the number of sub-signatures used in patch file creation are also possible, and will be immediately apparent to those of ordinary skill in the art. Accordingly, the discussion above of variations on the process of FIG. 4b should not be taken to indicate that similar variation is not also possible in other approaches to patch creation, and should be understood as being illustrative only of potential approaches which could be used in creating a patch file.

It should also be understood that, while discussed separately, the processes of FIGS. 4a and 4b (as well as variations on the same) are not mutually exclusive, and that different embodiments might support the use of both processes, or use the process of FIG. 4a to address issues the above disclosure indicates are appropriate for the process of FIG. 4b (or vice versa). To illustrate, consider a case where an entity operating a system which is used to transfer files observes that, for files of a first format, files to be transferred will generally have a large number of 1K portions which are identical to 1K portions in the files that will be used as the basis for a patch. To take advantage of this, that entity might want to implement patch creation using a process such as shown in FIG. 4a where signatures are created based on 1K portions of files. However, that entity might also observe that, for files of a second format, the lengths for the sections of files to be transferred that are identical to sections of the files to be use as the basis for a patch are highly variable. To account for this, the entity might configure its patch creation so that patches for files having the first format would be created using the process of FIG. 4a with signatures created based on 1K portions of the files, while patches for files having the second format would be created using the process of FIG. 4b. Other variations, such as where different processes are used depending on available resources (e.g., if there are extra processor cycles, use the process of FIG. 4b) are also possible.

Figure 5:
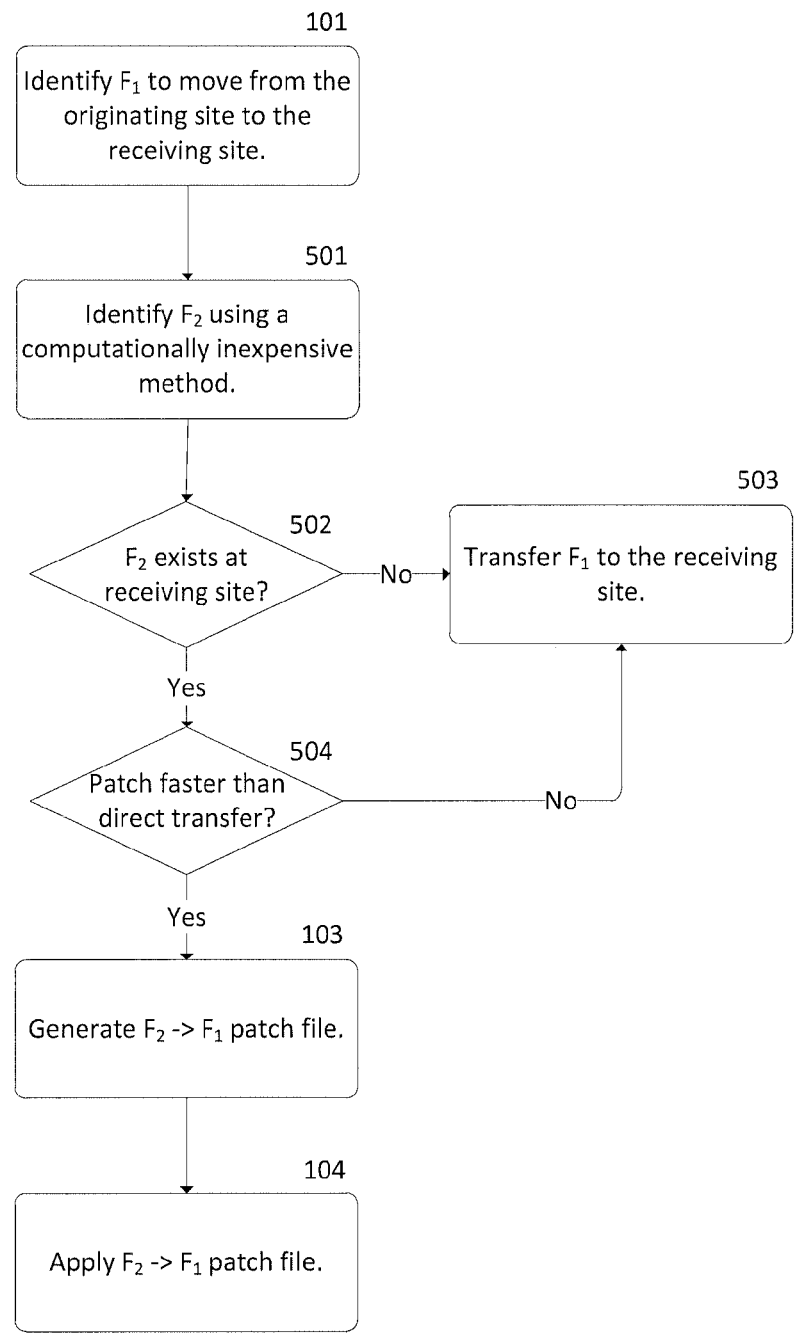
FIG. 5 illustrates a high level method which could be implemented based on this disclosure and used to transfer data from an originating site to a receiving site.

While the above disclosure set forth illustrations of how performance of the steps in the process of FIG. 1 could vary from embodiment to embodiment, it should be understood that different embodiments of the inventors' technology can vary from one another in more than just the performance of the steps of FIG. 1. As an example of this, consider the method depicted in FIG. 5, which differs from FIG. 1 by adding additional steps to the process shown in that figure. In FIG. 5, the step of identifying the file at the receiving site ($F_2$) which is most similar to the file to be moved ($F_1$) is performed using a computationally inexpensive method [501] which may not result in a similar file being identified. For example, the step of identifying the file using a computationally inexpensive method [501] could be performed using a function which returns a pointer to the most recent previous version of $F_1$ at the receiving site or, if there is no previous version of $F_1$ at the receiving site, returns NULL. To account for the possibility, the method of FIG. 5 checks if $F_2$ actually exists at the receiving site [502]. If it does not, then $F_1$ will be sent directly from the originating site [503] (generally after some additional processing, such as compression and encryption, which might be appropriate in a given implementation).

Further, in the method of FIG. 5, even if a similar file is identified at the receiving site, a patch as discussed in the context of FIG. 1 might not be created, because the method of FIG. 5 includes a second check to determine if sending a patch is likely to be faster than directly transferring $F_1$ from the originating site [504]. To illustrate how this might take place,
consider the equations of table 6, which can use the variables set forth in table 7 to provide estimates of the amount of time it would take to transfer $F_1$ using various transfer methods. Once those estimates have been derived, the fastest method can be chosen, thereby avoiding unnecessary delay in replicating $F_1$ at the receiving site.

TABLE 6

Exemplary time calculation equations

| | |
|---|---|
| $Time_{static\_diff\_receipt} =$ | $Time_{sig\_create} + Time_{static\_diff\_create} + Size_{static\_diff}/Rate_{transfer}$ |
| $Time_{static\_diff\_create} =$ | $Size_{static\_diff}/Rate_{static\_diff\_create}$ |
| $Time_{sig\_create} =$ | $Size_{sig}/Rate_{sig\_create}$ |
| $Time_{no\_diff\_receipt} =$ | $Size_{F1}/Rate_{transfer}$ |
| $Time_{dynamic\_diff\_receipt} =$ | $Time_{sig\_create} + Time_{dynamic\_diff\_create} + Size_{dynamic\_diff}/Rate_{transfer}$ |
| $Time_{dynamic\_diff\_create} =$ | $Size_{dynamic\_diff}/Rate_{dynamic\_diff\_create}$ |
| $Size_{static\_diff} =$ | $Diff_{F1\_F2} + ((Size_{F1}/Diff_{F1\_F2}) \% Size_{sig\_block}) * Size_{F1}/Diff_{F1\_F2}$ |
| $Size_{sig} =$ | $Size_{F1}/Size_{sig\_block}$ |
| $Size_{dynamic\_diff} =$ | $2 * Diff_{F1\_F2}$ |
| $Diff_{F1\_F2} =$ | $Size_{F1} * (1 - Sim_{F1\_F2})$ |

TABLE 7

Exemplary variables for estimating transfer times.

| Variable | Meaning |
|---|---|
| $Time_{static\_diff\_receipt}$ | Estimated time to replicate $F_1$ using a patch file created using a process based on sub-signatures corresponding to static amounts of data such as shown in FIG. 4a. |
| $Time_{static\_diff\_create}$ | Time to create the patch file using a process based on sub-signatures corresponding to static amounts of data such as shown in FIG. 4a. |
| $Time_{sig\_create}$ | An estimate of the time necessary to create the signatures of $F_1$ used in generating a patch file. |
| $Time_{no\_diff\_receipt}$ | The time it would take to transfer $F_1$ without using a patch file. |
| $Time_{dynamic\_diff\_receipt}$ | Estimated time to replicate $F_1$ using a patch file created using a process based on sub-signatures corresponding to dynamically determined amounts of data such as shown in FIG. 4b. |
| $Time_{dynamic\_diff\_create}$ | Time to create the patch file using a process based on sub-signatures corresponding to dynamic amounts of data such as shown in FIG. 4b. |
| $Size_{static\_diff}$ | Estimated size of a $F_2 \rightarrow F_1$ patch created using a process based on sub-signatures corresponding to static amounts of data such as shown in FIG. 4a. |
| $Size_{sig\_block}$ | The size of the portion of $F_1$ corresponding to a sub-signature from the dense signature of that file which, in the examples set forth herein, has generally been 2K. |
| $Size_{sig}$ | Size of the signatures used in generating the patch file. |
| $Size_{F1}$ | The size of $F_1$. |
| $Size_{dynamic\_diff}$ | Estimated size of a $F_2 \rightarrow F_1$ patch created using a process based on sub-signatures corresponding to dynamic amounts of data such as shown in FIG. 4b. |
| $Sim_{F1\_F2}$ | A value between 0 and 1, representing the similarity between $F_1$ and $F_2$. This type of similarity value can be estimated by checking the similarity between data associated with $F_1$ and $F_2$, such as filename, author, create date, size, format, and/or number of sub-signature matches when identifying $F_2$. |
| $Rate_{transfer}$ | The bandwidth of the connection between the originating site and the receiving site. |
| $Rate_{static\_diff\_create}$ | The rate at which the $F_2 \rightarrow F_1$ patch can be created using a process based on sub-signatures corresponding to static amounts of data such as shown in FIG. 4a. This can be estimated by multiplying the speed of the system creating the $F_2 \rightarrow F_1$ by the number of |

TABLE 7-continued

Exemplary variables for estimating transfer times.

| Variable | Meaning |
|---|---|
|  | instructions necessary to execute the comparison and signature generation steps of FIG. 4a. |
| $Rate_{sig\_create}$ | The rate at which the signature used in creating a patch file is created. This will generally be based on the speed of the system and the algorithm used to create the sub-signatures (e.g., hashing v. checksumming). |
| $Rate_{dynamic\_diff\_create}$ | The rate at which the $F_2 \rightarrow F_1$ patch can be created using a process based on sub-signatures corresponding to dynamic amounts of data such as shown in FIG. 4b. This can be estimated by multiplying the speed of the system creating the $F_2 \rightarrow F_1$ by the number of instructions necessary to execute the comparison and signature generation steps of FIG. 4b by a factor representing average number of comparisons needed for each instruction in the $F_2 \rightarrow F_1$ patch (e.g., $\log_2$<number of sets of sub-signatures>). |
| $Diff_{F1\_F2}$ | Amount of data in $F_1$ which is different from the data in $F_2$. |

Of course, it should be understood that, even in systems which are configured to determine the fastest way to transferring files, the equations and variables set forth in tables 6 and 7 might not be used in that determination. For example, if a signature for $F_1$ is already available (e.g., because it was previously created as part of a transfer to a different receiving site), then, in some instances, $Time_{sig\_create}$ could be set to 0, rather than calculated as shown. Similarly, in some cases, additional variables and/or equations might be used to represent the fact the files would likely be transferred from the originating site to the receiving site in a compressed form. It is also possible that different implementations might use different approaches to measuring the similarity between $F_1$ and $F_2$ (e.g., calculating Jaccard similarity, or applying local sensitivity hashing), or might not need to consider the similarity between $F_1$ and $F_2$ at all (e.g., some implementations might be configured to determine how to transfer files based on file types, rather than based on similarity calculations).

Combinations of the above approaches are also possible. For example, instead of supplanting use of similarity calculations, file type information could be used to supplement similarity data by supplying additional time factors which could be determined based on the characteristics of the file types. Similarly, variations could be implemented which seek to balance other considerations, rather than simply optimizing speed. For example, if a time calculation indicates that there are multiple methods of transferring a file which would satisfy the requirements for the transfer (e.g., a service level agreement), then the cheapest method, or the method which makes the least use of a scarce/expensive resource (e.g., in a situation with limited network capacity, this could be bandwidth; in a situation with limited processing capacity, this could be processor cycles; in a situation with multiple limitations, this could be whichever limited resource had the highest marginal cost; etc) could be used. Bandwidth needed for uses other than file transfers could also be considered. For example, if a transfer is scheduled to take place during business hours, then priority could be given to transfer methods which would minimize bandwidth consumption, so the network used to transfer data would not be rendered unavailable for other uses. Other factors could also be used, and will be immediately apparent to those of ordinary skill in the art.

Accordingly, the discussion above of factors which could be considered in deciding how to transfer data should be understood as being illustrative only, and not limiting.

It is also possible that determinations of what method to use in transferring files could be made in the process of executing other steps, rather than being a threshold determination as shown in FIG. 5. To illustrate, consider how a process such as shown in FIG. 1, where generation of the $F_2 \rightarrow F_1$ patch unconditionally follows identification $F_2$ [102], could be modified so that patch generation [103] could include collection of data that could be used to switch to a more efficient replication approach on the fly. In such an implementation, patch generation could start with using a process based on sub-signatures corresponding to static amounts of data such as shown in FIG. 4a. However, if there were too many misses when comparing the sub-signatures for $F_1$ and $F_2$, it could automatically abort creation of the patch file and switch to simply sending $F_1$ to the receiving site. This might happen directly, or could only take place after trying (and failing) to more efficiently generate a patch using sub-signatures corresponding to dynamic amounts of data. Other variations are also possible, and will be immediately apparent to one of ordinary skill in the art. Accordingly, the discussion above should be understood as being illustrative only, and should not be treated as limiting.

Figure 6:
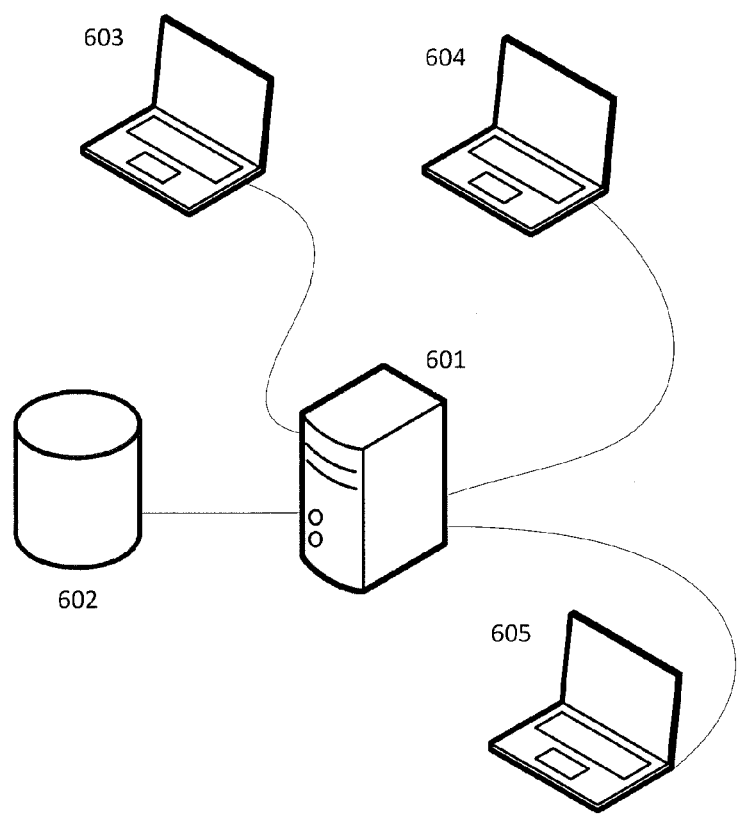
FIG. 6 illustrates an architecture which can be used to transfer files through a central server.

While the discussion set forth above explained how file transfer between sites can be optimized using different steps, it is possible that the architecture of a system implementing the inventors' technology could be used to optimize the process as well. One example of such an architecture is provided in FIG. 6, in which, rather than having a single originating site and a single receiving site, there are multiple remote computers [603]-[605] and, instead of being connected directly with one another, those remote computers [603]-[605] are connected through a central server [601] which is itself connected to a database [602]. To illustrate how an architecture such as shown in FIG. 6 could be used to optimize the transfer of data between the remote computers [603]-[605] consider FIG. 7, which depicts a process that could be used in synchronizing those sites with one another.

Figure 7:
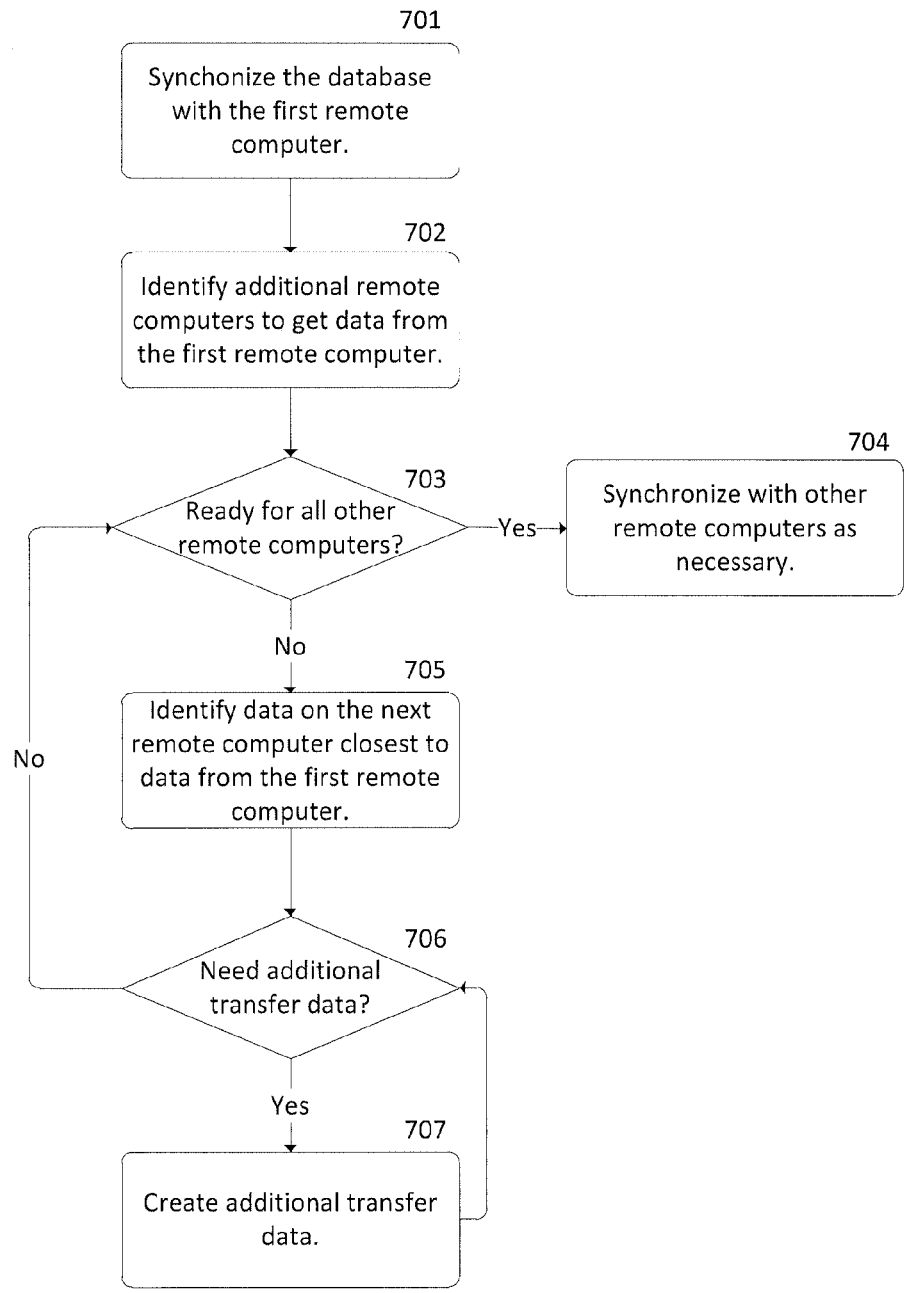
FIG. 7 illustrates how the transfer of files between remote computers could be mediated by a central server.

In FIG. 7, the depicted process begins with the database [602] being synchronized [701] with a first remote computer [603]. As will be immediately apparent to one of ordinary skill in the art, this synchronization could be accomplished simply by using the techniques described previously, with the server [601] (which would transfer any data to the database [602]) playing the part of the receiving computer. However, preferably this synchronization [701] will be modified to take advantage of additional capabilities which could be provided by an architecture such as shown in FIG. 6. For example, given a database [602] with sufficient storage capacity, it would be possible for it to store copies of data being synchronized corresponding to each of the remote sites [603]-[605]. Thus, if an architecture such as shown in FIG. 6 were being used to synchronize design directories at each of three remote sites [603]-[605], then the database [602] could maintain three copies of the design directory, one containing the information most recently uploaded from the first remote computer [603], one containing the information most recently uploaded from the second remote computer [604], and one containing the information most recently uploaded from the third remote computer [605]. In this type of scenario, preferably, the synchronization [701] would be performed by making sure that all of the data from the first computer [603] which would be synchronized with the other remote computers [604][605] (e.g., data from the design directory) was stored in the portion of the database [602] which corresponded to that first computer.

After the database [602] had been synchronized [701] with the first remote computer [603], the process of FIG. 7 would continue by identifying [702] additional remote computers which would need to be provided with data from the first remote computer [603]. For example, where a server [601] is connected to two additional remote computers, it is possible that only one of those additional remote computers would need to be provided with the data from the first remote computer [603]. This might be the case in situations where a design team has members located at the site of the first remote computer [603] and the second remote computer [604], but not at the site of the third remote computer [605]. To support this, the central server [601] could be provided with a list of which data from which remote computers should be sent to which other remote computers (e.g., the design directories on the first and second remote computers should be synchronized, the marketing directories on the second and third computers should be synchronized, etc). Then, to identify [702] the additional remote computers, the central server [601] could, for each remote computer, identify if any data in the portion of the database [602] corresponding to the first remote computer [603] was (1) modified or created since the last time that remote computer had been synchronized with the database [602] and (2) was data that remote computer should have in common with the first remote computer [603]. Each remote computer for which the server [601] was able to identify data having both of those characteristics would then be identified [702] as needing to be provided data from the first remote computer [603].

After the identification [702] had taken place, the process of FIG. 7 would proceed with a check [703] to determine if all appropriate steps to prepare to transfer the data from the first remote computer [603] to the identified remote computers had been performed. If all such steps had been performed (e.g., because the identification [702] revealed that none of the other remote computers [604][605] needed the data from the first remote computer [603]), then the data from the first remote computer [603] could be synchronized with the other remote computers as necessary [704]. This could be done using techniques such as described previously, with the server [601] (which would pull data from the portion of the database [602] corresponding to the first remote computer [603]) playing the role of the of the originating site, and the remote computers to be synchronized playing the roles of the receiving sites.

Alternatively, if all appropriate steps to transfer the data from the first remote computer [603] to the other remote computers had not been performed, the process of FIG. 7 would continue with identifying [705] the data on the next remote computer which is closest to the data to be transferred. Preferably, this identification [705] will take place by using signature comparison approaches such as discussed in the context of FIG. 3, though, of course, variations, such as identification of data using version information, are also possible. Once the identification [705] had taken place, the next step would be to determine [706] if additional data should be created to facilitate the transfer of the information from the first remote computer [603] to the other remote computer being considered. This additional transfer data could be things such as patch files showing how to derive the data to be provided to the remote computer being considered from the closest data on that computer, signatures for the files from the first remote computer or the similar files on the remote computer being considered, or other information that could be used in the data transfer process.

To illustrate how this determination [706] might take place, consider a scenario in which, during the initial synchronization [701] a patch file ($F_2 \rightarrow F_1$ patch) was created indicating how a file from the first remote computer [603], $F_1$, can be derived from the closest file in the database [602], $F_2$, and where the database [602] indicates that the closest file to $F_1$ on the remote computer being considered is a third file, $F_3$. In this scenario, the central server [601] could begin by evaluating whether a file which could be used to derive $F_1$ from $F_3$ (i.e., a $F_3 \rightarrow F_1$ patch) was already available (e.g., because it had previously been created when preparing to send $F_1$ to another remote computer). If the central server [601] found that the $F_3 \rightarrow F_1$ patch was available, and that the only data that would need to be provided to the remote computer being considered was $F_1$, then it could indicate that no additional transfer data was needed, and the process of FIG. 7 could loop back to check [703] if there was any further preparation needed to transfer data from the first remote computer [603] to another remote computer. Alternatively, if the central server [601] found that the $F_3 \rightarrow F_1$ patch was not available, it could determine if (or retrieve information which had previously been stored in the database [602] indicating whether) it would make sense to create that patch. Depending on this determination, which could be made using approaches such as those discussed previously, the central server [601] could either create [707] the $F_3 \rightarrow F_1$ patch then perform another check [706] if any additional transfer data was needed, or loop back to check [703] if there was any preparation needed for other remote computers, if $F_1$ was the only information that would need to be transferred to the remote computer then under consideration.

Variations on the above approaches to determining whether additional transfer data is needed [706] are also possible. For example, instead of simply checking to see whether a $F_3 \rightarrow F_1$ patch file is available (or necessary), in some instances a central server [601] could check on the availability of data that could be used to create that (or other) patch files as well. This could be useful in situations where, when the time comes to synchronize the remote computer being considered, $F_3$ is no longer present on that system (e.g., because $F_3$ is altered between the time it was uploaded to the database and the time the remote computer being considered is synchronized with the data from the first remote computer). In such a situation, if the signatures for $F_1$ had already been stored in the database [602], then they could be used to eliminate the generation of sub-signatures [404] when using processes such as shown in FIGS. 4a and 4b to create a patch file for deriving $F_1$ from the new closest file on the remote computer being considered.

To take advantage of this, in some implementations, checking for whether additional transfer data is necessary [706] could include checking for whether intermediate data was present and, if it was not, indicating that that intermediate data should be created [707] in preparation for potential future transfers. Other steps from FIG. 7 could also be implemented to support this type of approach. For example, in the initial synchronization [701], in addition to sending the data necessary to synchronize the database with the first remote computer (e.g., $F_1$, or an appropriate patch file) intermediate information which could be useful in future transfers (e.g., signature files) could also be provided. Additionally, in some cases, the initial synchronization [701] might be modified specifically to take into account where the data from the first remote computer [603] would be transferred. For example, if the data to be transferred from the first remote computer [603] included a patch file for deriving a file from the first remote computer [603] ($F_1$) from a file on a second remote computer

[604] (F₂), then the server might simply store that patch file in the database [602] for use during a later synchronization of the second remote computer, rather than using the patch file to generate a new copy of F₁. In any case, after all appropriate preparation for transferring the data from the first remote computer [603] to the other remote computers was complete, those other remote computers could be synchronized [704] with the data from the first remote computer [603] as necessary.

Of course, it should be understood that performing the specific steps of FIG. 7 in the order shown is not a requirement, either for systems implementing an architecture as shown in FIG. 6, or to obtain better performance than would be possible using point to point connections between remote computers. To illustrate, consider the fact that, as set forth in the context of FIGS. 1-5, in different implementations, synchronization between computers can be triggered in a variety of manners. In some cases, this could result in synchronization being triggered before preparations to transfer the data from the first remote computer to the other remote computers had been completed. For example, if a central server [601] was configured to cause a database [602] to be synchronized with a first remote computer [603] at the close of business in that computer's local time zone (e.g., by putting a upload data command in a queue which would be polled by the first remote computer [603]), and was configured to cause a second remote computer [604] to be synchronized with that data four hours later at the start of business in that computer's local time zone (e.g., by putting download data command in a queue which would be polled by the second remote computer [604]), and time to complete preparation for synchronization was five hours, then the synchronization of the second remote computer [604] would take place before preparation was complete.

To account for this possibility, rather than giving up the benefits of preparation, the preparation could be structured to account for the fact that synchronization might begin before the preparation was complete. For example, the central server [601] could be configured to check when synchronization for the other remote computers [604][605] was scheduled, and could perform the transfers according to the order in which the remote computers were scheduled to be synchronized. This would provide a greater chance that the preparation for the first computer to be synchronized (in this example, the second remote computer [604]) would be completed before synchronization for that computer would take place. In this way, the benefits of preparation described above could be obtained, even though the process depicted in FIG. 7 could not be followed.

Of course, it should be understood that the ability to prepare for future transfers is not the only benefit which could be obtained from using a centralized architecture such as shown in FIG. 6, rather than relying on multiple point to point connections to synchronize computers at remote sites. For example, using an architecture such as shown in FIG. 6, if a computer at a first remote site needed to receive information from computers at three other remote sites, this could be achieved by the computers at the other remote sites uploading their information to the database [602], and then the computer at the first remote site downloading that information as a single download from the database [602]. By contrast, a system relying on multiple point to point connections would need to have three downloads directly from the other remote sites to the computer at the first remote site. Even worse, if a computer at a second remote site also needed to download that same information, then it would need to be separately communicated from the remote sites where it originated to the second remote site, leading to a substantial increase in the amount of network resources which would need to be devoted simply to shuttling information between systems. Accordingly, while the discussion of FIG. 6 focused primarily on how an architecture such as shown in that figure could be used to allow preparation for data transfers, other benefits can also be obtained using such an architecture, and no system should be treated as being outside the scope of the protection accorded by this or any related document simply because it may not fully exploit the potential for preparing for future transfers.

Figure 8:
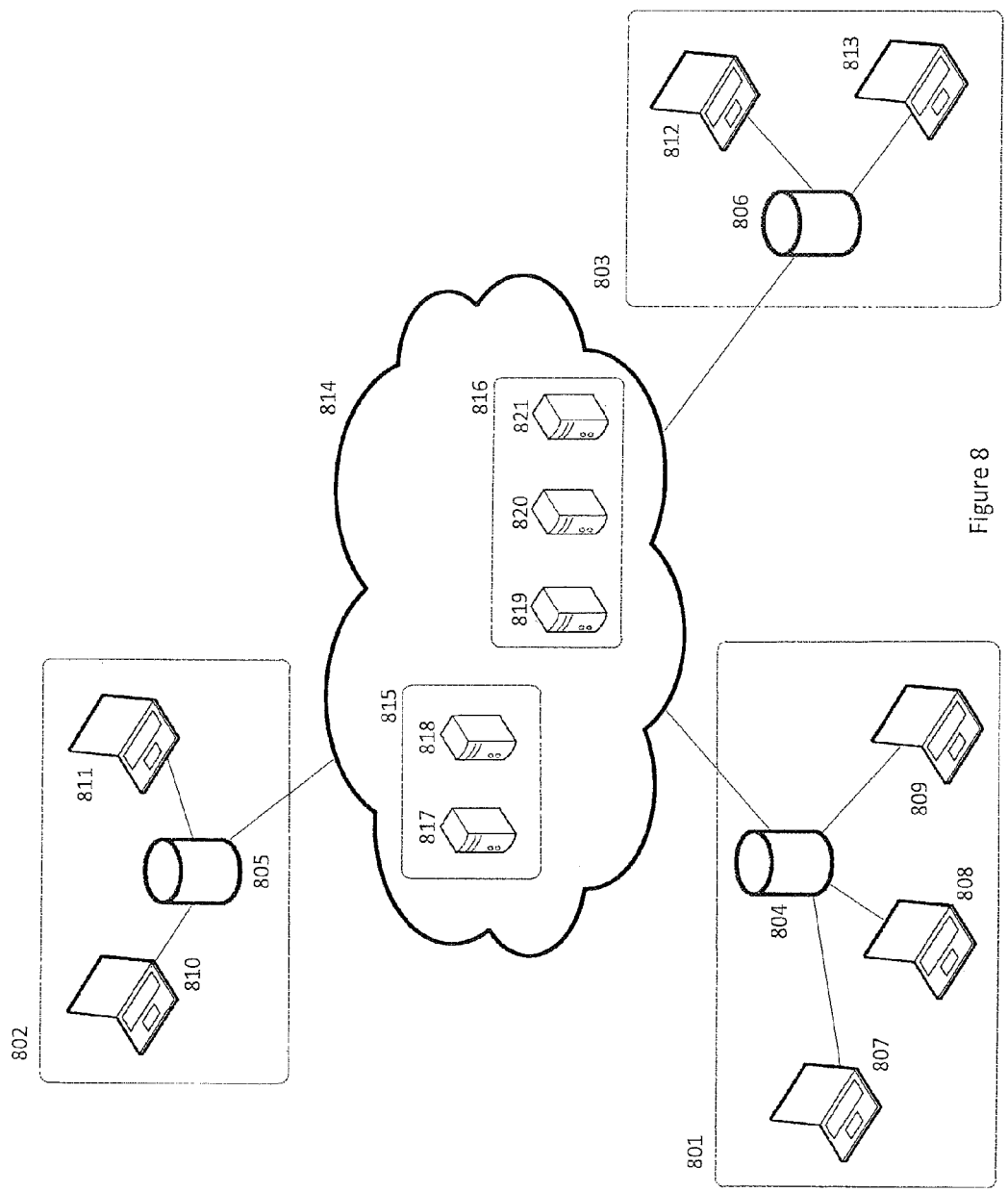
FIG. 8 depicts an architecture in which a plurality of remote sites each maintain a local database connected to one or more local computers and a cloud based transfer service.

Of course, using an architecture such as shown in FIG. 6 is not a requirement for obtaining the ability to prepare for future transfers and other benefits as described above. For example, FIG. 8 depicts an architecture in which a plurality of remote sites [801]-[803] each maintain a local database [804]-[806] connected to one or more local computers [807]-[813] and a cloud based transfer service [814]. In such an architecture, the computers [807]-[813] could be synchronized by storing the files to be synchronized in the local databases [804]-[806] at the remote sites [801]-[803], then synchronizing those databases [801]-[803] with one another using the cloud based transfer service [814] which could use processes such as shown in FIG. 9 to replace, and, in some cases, improve on, the functionality of the server [601] and database [602] of FIG. 6.

Figure 9:
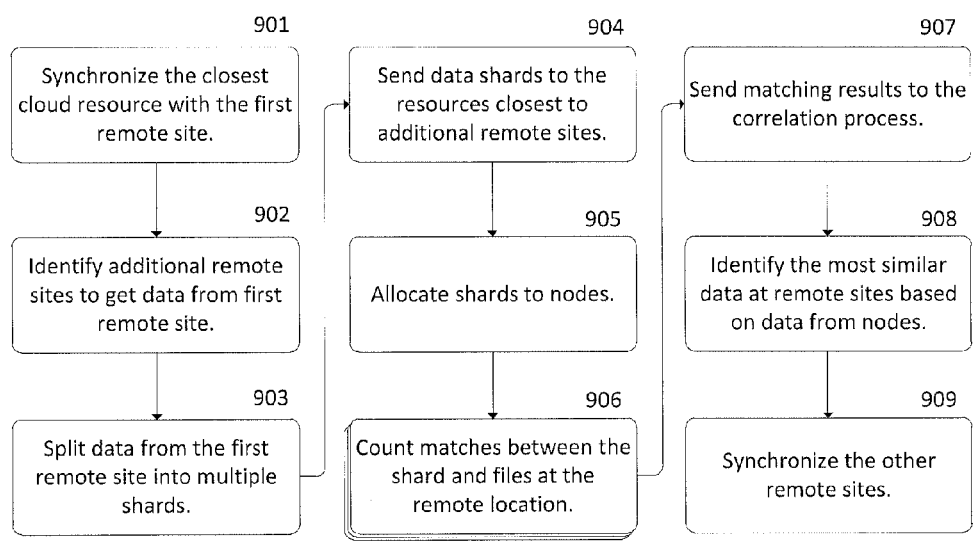
FIG. 9 a process which can be used to take advantage of scalable cloud based computing resources when transferring data between remote sites.

Turning now to FIG. 9, that figure shows a process which can be used to take advantage of scalable cloud based computing resources when transferring data between remote sites. Initially, the process of FIG. 9 begins with the closest resources in the cloud based transfer service [814] being synchronized [901] with a first remote site [801], and the additional remote sites to get the data from the first remote site [801] being identified [902]. These steps can be performed in essentially the same manner as the initial synchronization [701] and identification [702] steps of the process of FIG. 7, though, when using a cloud based transfer service [814], the synchronization [901] would preferably be with resources (e.g., databases) in the cloud which are relatively close to the site being synchronized. For example, in the case of a cloud based transfer service [814] comprising a plurality of servers [815][816], at the time the remote sites [801]-[804] were set up to work with the transfer service [814], the servers which are closest to the remote sites [801]-[803] could be identified, and the remote sites [801]-[803] could be configured to communicate with the transfer service [814] through their closest servers. In this way the initial synchronization [901] could be performed in a manner that would result in the cloud transfer service [814] being provided with the information from the first remote site [801] in a manner that would not unnecessarily tie up the transfer service's network resources, or require the first remote site [801] to establish a connection with and communicate data to an unnecessarily distant target.

In any case, once the initial synchronization [901] and identification [902] steps have taken place, the process of FIG. 9 continued with the data from the first remote site [801] being split into multiple shards [903]. This sharding [903] process can be performed by identifying the resources which are closest to the additional remote sites which will need to be provided with the data from the first remote site, then splitting that data into individual pieces (i.e., shards) which can be processed in parallel by those resources to find the most similar files on the relevant remote sites. To illustrate, consider the case of a cloud based transfer service [814] comprising a plurality of servers [815][816] supporting a plurality of nodes [817]-[821]. In the case where the data from a first remote site [801] would have to be transferred to third remote site [803] which was closest to a second server [816] supporting three nodes [819]-[821] the data from the first remote site [801] could be split up into three shards which could be processed in parallel by the nodes on [819]-[821] on the second server [816]. Similarly, in a case where the resources available to the cloud based transfer service [814] are dynamically scalable (e.g., where the individual nodes are virtual computers hosted by a server at a data center), the sharding process [903] could weigh the benefits of processing the data from the first remote site [901] more quickly against the cost of having more nodes allocated to that processing, and split the data up into the appropriate number of shards according to that analysis.

Of course, splitting up the data from the first remote site [801] so that there is a 1:1 relationship between shards and nodes to process that data is not a requirement for embodiments which perform a process such as shown in FIG. 9 on an architecture such as depicted in FIG. 8. For example, in some cases, the data might be split up so that the number of shards is greater than the number of nodes to account for the fact that some nodes might complete their processing more quickly than others, and therefore could be expected to handle multiple shards without sacrificing the overall benefits of parallel processing. Similarly, in some cases, nodes other than those available at the resources closest to the site to receive the data from the first remote site could be considered in the sharding process. For example, in a case where a second server [816] is the closest to the site to receive the data from the first remote site [801], but a first server [815] is supporting nodes [817] [818] which are (and which are expected to remain) idle until after the data from the first remote site [801] can be processed, the sharding process [903] can split up the data from the first remote site [801] so that it can be processed by the nodes [817][818] on the first server [815] as well. It is also possible that multiple additional remote sites might need to be provided with the data from the first remote site, in which case, in some embodiments, the resources at those additional remote sites could be considered during the sharding process [903]. Accordingly, the discussion of sharding [903] set forth above should be understood as being illustrative only, and not limiting.

Once the sharding [903] has taken place, the data shards are sent [904] to the resources which will be used to process them, which preferably, and as shown in FIG. 9, will be the resources closest to the additional remote sites. Once there, the shards can actually be allocated [905] to the nodes which will perform the processing. For example, the data shards could be stored in memory that would be shared by the nodes, and a controller process at the server supporting those nodes could then issue commands causing those nodes to process the data stored in particular locations in that shared memory. Alternatively, in some cases this allocation could be performed according to decisions which were made before the shards were sent to the servers storing the nodes which would process them. For example, at the time the data was being sharded [903] a controller process could have decided which nodes that data would be allocated to based on information such as how quickly the data from the first remote site would have to be provided to the other remote sites (e.g., as might be dictated in a service level agreement between the entity controlling the remote sites and the entity maintaining the cloud based transfer service), the cost of allocating additional processing nodes to the data (which cost might vary based on day and time that the processing would take place), whether new nodes would have to be allocated to perform the processing as opposed to the processing being performed by nodes which are already available, the impact that node allocation might have on the cloud based transfer service's ability to fulfill its commitments to other clients (e.g., as set forth in those clients' service level agreements), and/or other factors which could be relevant in the allocation of resources and minimization of cost for processing. In such a case, the allocation [905] of shards to nodes could be nothing more than implementation of the decisions that had already been made at the sharding [903] stage. Indeed, in some cases, those decisions could have controlled where the data shards were sent [904], and the allocation [905] might be nothing more than inserting the shards into a queue at the relevant locations. Other variations are also possible, and will be immediately apparent to those of ordinary skill in the art. Accordingly, the discussion of allocation [905] of shards to nodes should be treated as being illustrative only, and not limiting.

However it takes place, once the shards had been allocated [905], the nodes could process those shards to determine which files at the relevant remote locations were most similar to the data in those shards. While, as set forth previously, there are many ways that similarity between data to be synchronized and files at remote sites can be determined, this will preferably take place by, as shown in FIG. 9, each node counting [906] the matches between the shard(s) it is processing and the files at the remote location. This counting [906] of matches can be done in a variety of manners, including those discussed in the context of FIG. 3 for identifying files at a receiving site which are similar to files at an originating site, though in some cases those approaches might be modified to account for the fact that they are taking place in a cloud environment.

To illustrate how the counting [906] of matches could be structured to account for the resources available in a cloud based environment, consider the fact that, in a cloud based environment (like in some embodiments with a central server [601] and database [602] as shown in FIG. 6), there might be a database containing signatures and sub-signatures that would be used in comparing the files at the remote sites against information which might be sent to those sites. Such a database could include, for each file, $F_n$, a set of checksums with one checksum for each non-overlapping 2K block of data in the file. In an embodiment including such a database, to process a shard from the data to be synchronized, each node could produce a set of sub-signatures by, for each byte in the shard, calculating a checksum for the following 2K block of data from the shard, then comparing those checksums to the checksums from the database. These comparisons could be used to generate records of each time a node identified a match between a sub-signature from a shard and a file from the relevant remote location. As set forth below, these records could be used to allow the processing by the nodes to replace the processing that would have been performed by a central server or a computer at the originating or receiving site using non-cloud based architectures.

After the nodes had processed their shards (e.g., by counting matches [906]), the results of that processing could be sent [907] to a process which would be responsible for combining them to identify [908] the data at the other remote sites which is most similar to the data from the from the first remote site. Depending on the processing which takes place at the nodes, this identification [908] could be performed straightforwardly by combining the fragmented results from the individual nodes. To illustrate, consider table 8, which shows potential results of comparing three shards from a file, $F_1$, which were distributed to three different nodes, and processed by counting how many matches existed between the signatures for those shards and the signatures for the files ($F_2$, $F_3$, $F_4$) at the remote location.

TABLE 8

Exemplary results of node processing.

|   | $F_{1-1}$ | $F_{1-2}$ | $F_{1-3}$ |
|---|---|---|---|
| $F_2$ | 8 | 12 | 5 |
| $F_3$ | 3 | 8 | 9 |
| $F_4$ | 9 | 11 | 6 |

To combine the results from the three nodes, a process at the server closest to the remote site of interest could sum the matches for each of the files, to determine that $F_4$ was a slightly better match for $F_1$ (26 matches observed) than $F_2$ (25 matches observed).

Finally, after the most similar data at the remote sites had been identified [908], the process of FIG. 9 concludes by actually synchronizing [909] those remote sites with the data from the first remote site. This synchronization could be performed using techniques such as discussed previously, and [909] could potentially include the performance of some preparatory steps as well. For example, given the results of processing from the nodes shown in table 8, this preparation could include the creation of a $F_4 \rightarrow F_1$ patch file, and may also include generation of a $F_2 \rightarrow F_1$ patch file, given the fact that the similarity measures for $F_4$ and $F_2$ were almost identical.

Of course, it should be understood that, while the discussion of FIG. 9 focused on how identification of similar files could be structured in such a way as to take advantage of the parallel processing resources offered by a cloud based computing architecture, that is not the only aspect of the synchronization of data between remote sites that could be performed in a manner which would take advantage of a cloud based architecture. For example, consider the initial synchronization [901] between a first remote site [801] and the closest resources in the cloud based transfer service. This synchronization [901] can include identification of the files at the first remote site [801] to send to the cloud based transfer service [814]. Using the approach set forth in FIG. 2, this file identification could include the first remote site [801] polling the cloud based transfer service [814] and receiving a request to generate a list of files and signatures. The first remote site [801] could then send the list of files and signatures to the cloud based transfer service [814] which would compare the signatures with those in its database as described previously. However, to account for the parallel processing made possible by a cloud architecture, this could be modified by splitting the list of files and signatures into a plurality of different pieces, which pieces could then be analyzed independently from one another by different nodes in the cloud. Similar changes could be made to other steps, such as the parallel step of identify which other remote sites would need to be provided with the data from the first remote site. Accordingly, the discussion of using multiple nodes for identify files which are similar to the data to be transferred should be understood as being illustrative only of how a cloud architecture such as shown in FIG. 8 could be used, and should not be treated as limiting.

To provide a further illustration of how the inventors' technology could be applied in practice, consider the case of the fictional company CarPartMaker, Inc. CarPartMaker Inc. is an international company that designs and manufactures automobile parts. They have engineering offices located in Cincinnati, Sao Paulo, and Hong Kong, corresponding to remote sites [801]-[803] of FIG. 8. They use 3D CAD software to design the parts they make, and a document management system to track versions and control access to these designs. The document management system employs a vault at each office location, which is simply a local network file server that stores all of the company's design documents, and which corresponds to the local databases [804]-[806] of FIG. 8. For example, each design engineer at Cincinnati has direct access to the Cincinnati vault, but not to the vaults located at CarPartMaker's other offices. In this example, assume that the vaults must be hosted on their remote sites' local networks in order for their 3D CAD software to operate efficiently due to the sheer volume of data associated with each design package. Since all of the engineers in the company are working on related projects, each of the vaults at the international offices must be synchronized so that they all contain the same data. CarPartMaker uses a content delivery engine, corresponding to the cloud based transfer service [814] of FIG. 8, that has been configured to transfer any new data from "producing" vaults to "consuming" vaults. Each vault also has a client application installed which polls the content delivery engine for events that it is able to process.

In this example, Ken, an engineer in Hong Kong, has created a new design package for an automobile exhaust assembly. He checked this set of files into the document management system, which stored the files in the Hong Kong vault. At the end of the business day in Hong Kong, the scheduler creates a "run job" event, and the client application on the Hong Kong file server immediately picked up the event while polling the content delivery engine. This event prompted the client application to run a job, which scans the file system in order to upload any new data to the content delivery engine. In this case, the Hong Kong server can be thought of as the "producing" server.

As the job is executing, the client application comes across Ken's new design package and asks the content delivery engine which action it should take. Since these files have never been uploaded to the content delivery engine before, the action is determined to be, simply: upload the new files. The client application then compresses and encrypts each file and uploads each file to the nearest upload server in the content delivery engine. When a file arrives at the upload server, it is immediately processed by the mover, which puts the file into long term storage and records a successful transaction in the database. When the job completes, the content delivery engine generates a "run subscription" event for each of the consuming file servers.

The consuming vaults in this case are: Cincinnati and Sao Paulo. The client application running on each of these servers picks up the new subscription event, and requests a snapshot from the content delivery engine. A snapshot is the current state of the producing machine's "job", i.e. a list of the producing machine's files and some metadata about those files. The client application processes this snapshot and compares the hash of a file on disk to the hash of the corresponding file stored in the content delivery engine. In this example, the consuming vault has never had a copy of Ken's design, so the consuming vault will download all of these files.

The next day in Hong Kong, Ken discovers that he forgot to add dimension labels to some of the components in his car exhaust package. This results in just a small addition of text to each of the 3D documents that he updates. When the "run job" event happens at the end of the day, the client queries the content delivery engine about the files that were affected by these changes. The decision engine determines that an earlier version of each of these files already exists in the content delivery engine, so only the new changes should be uploaded. In order to upload just the changes of a file, the client downloads a signature of the previous version of the file comprising a set of checksums or hashes for non-overlapping blocks in that file and then creates a delta-encoded patch file. The client uploads the patch file to the content delivery engine, where the file making process creates the complete version of the updated file. At the end of this process, the subscription events are generated, and the consuming nodes download patch files in order to update their local files.

Tom, an engineer in Cincinnati, needs to create a slightly different version of Ken's exhaust assembly. Since the files have already been replicated into the Cincinnati vault, Tom is able to immediately check out Ken's design package from the file server and modify it using his 3D CAD software. He proceeds to lengthen the extension pipe between the catalytic converter and the muffler, and then saves this assembly as a new design package. At the end of Tom's work day, the client application on the Cincinnati file server detects a "run job" event and starts scanning the local file system for changes. When it finds that Tom has created a new set of files that were derived from Ken's original design package, the client asks the decision engine whether it makes sense to upload only the changes between the two packages. In this case, the answer is yes, and since the Cincinnati server already has both design packages, the client can create and upload a patch file in order for the content delivery engine to recreate the new package in its long term storage. When the Cincinnati's file server's job is complete, the consuming nodes begin their subscriptions. The servers in Sao Paulo, Berlin, and Hong Kong already have Ken's design package, and since a delta-encoded patch file between this and Tom's project already exists in the content delivery engine, the consuming servers can simply download it and create Tom's new design package locally.

Figure 10:
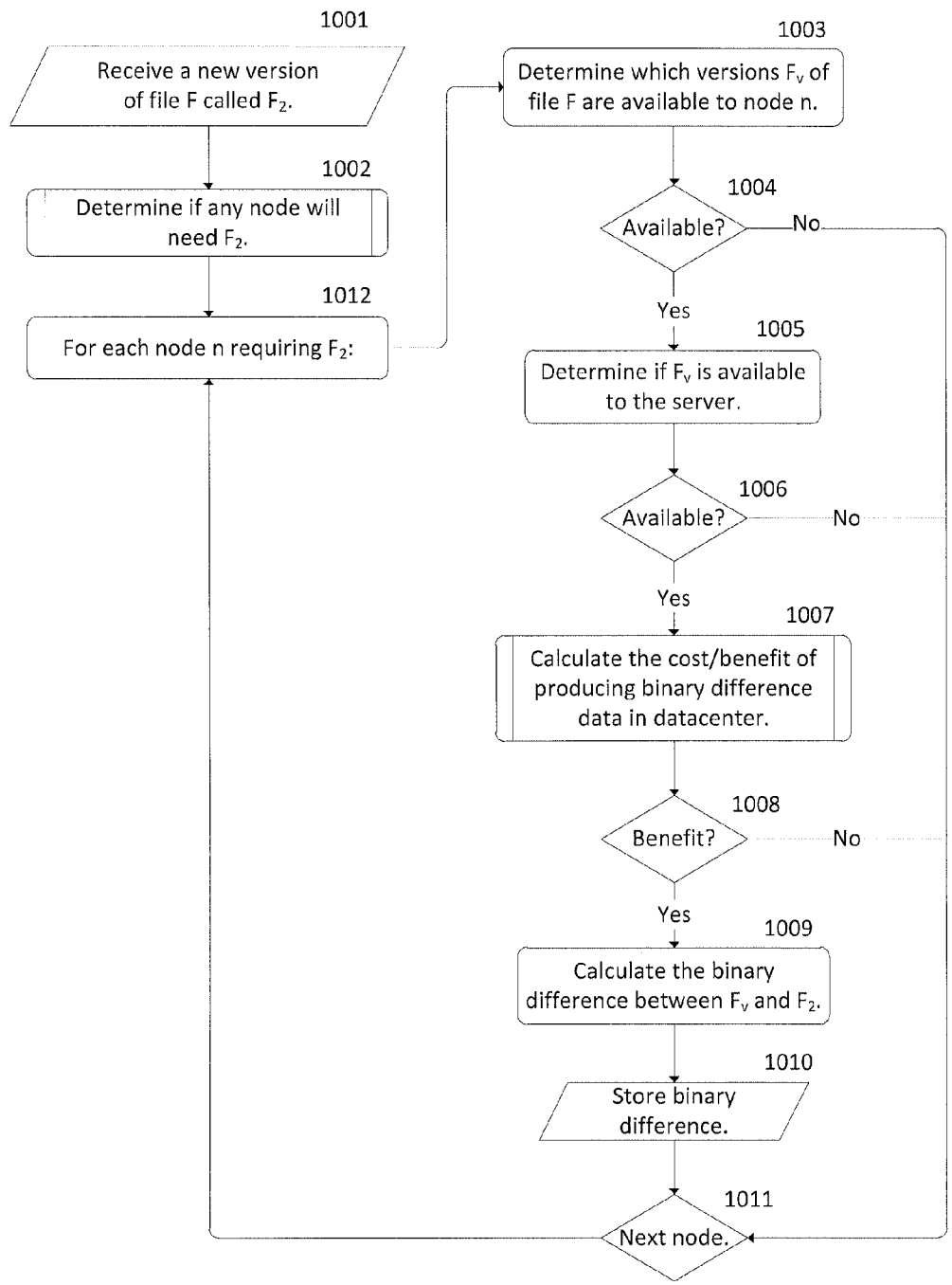
FIG. 10 depicts a process which could be used for determining whether it is cost justified to prepare for transferring a file to a remote site by creating a patch for that file.
Figure 11A:
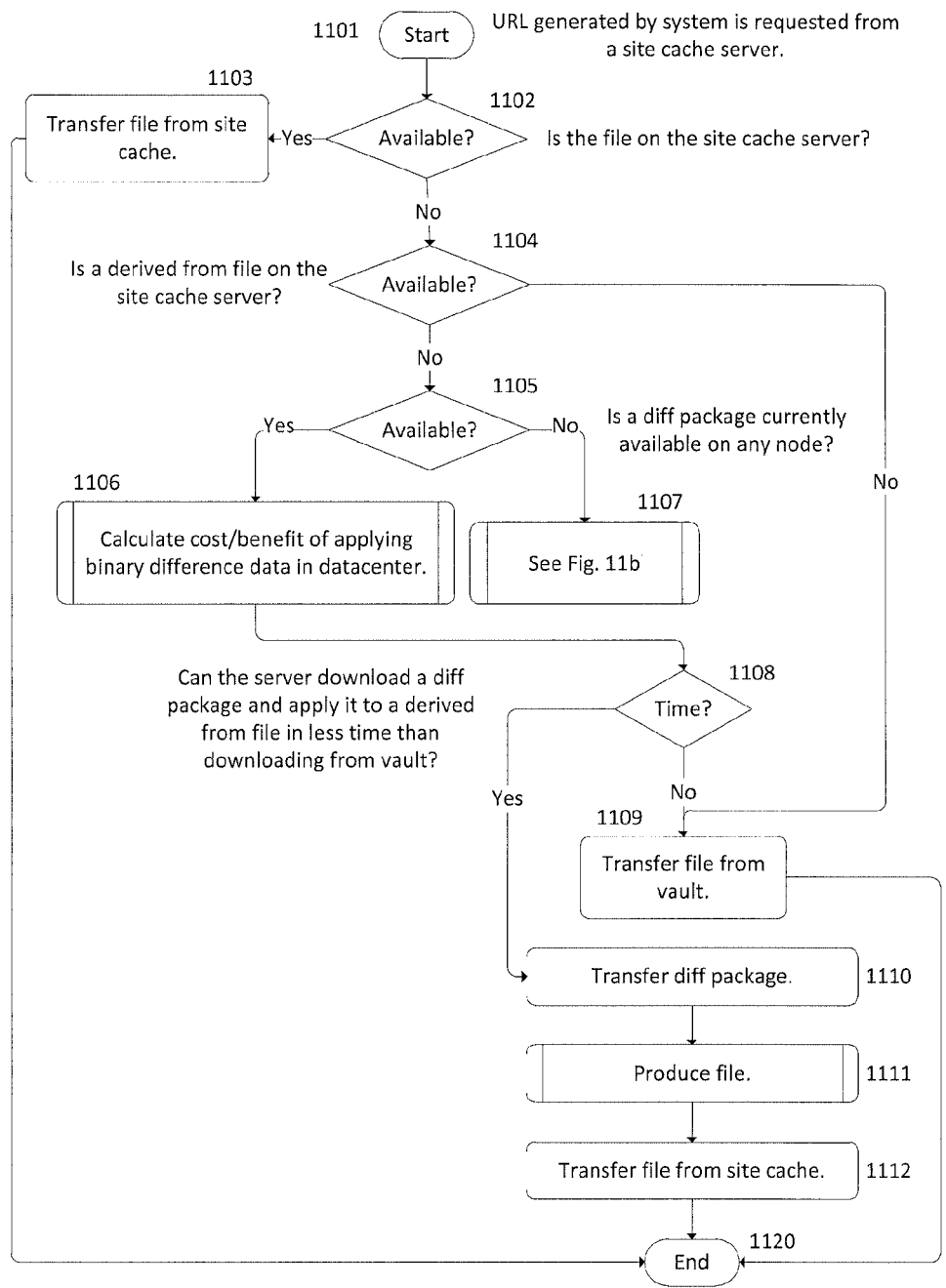
FIGS. 11a-11b depict a process which could be used in determining whether a file is already available at a particular remote site, or should be created at a node corresponding to that site.
Figure 11B:
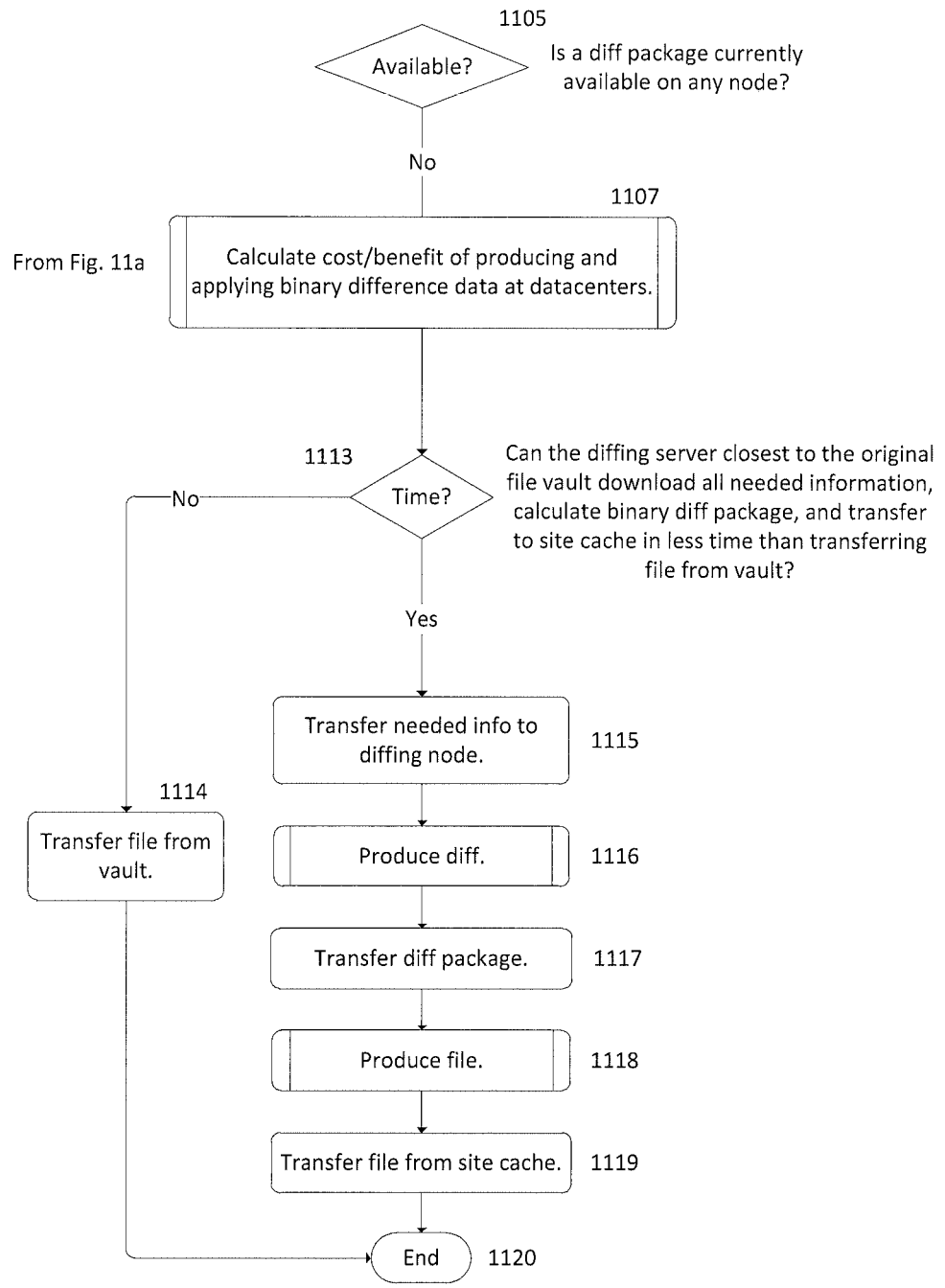

FIGS. 10 and 11 provide further illustrations of how the CarPartMaker, Inc. example above could be achieved in practice. FIG. 10 depicts a process which could be used for determining whether it is cost justified to prepare for transferring a file to a remote site by creating a patch for that file. FIGS. 11a-11b depict a process which could be used in determining whether a file is already available at a particular remote site, or should be created at a node corresponding to that site. It should be noted that, while the diagrams of FIGS. 10 and 11a-11b use some terminology which is somewhat different from that used in describing FIGS. 1-9 (e.g., "Diff" rather than "patch"; "data center" rather than "content delivery engine" or "cloud based transfer service," etc), that difference in technology does not, and should not be treated as, implying a divergence in the concepts underlying those figures from the concepts underlying the remainder of the disclosure of this application.

Using technology such as described herein, it is possible to achieve substantial increases in the efficiency of transferring data between sites. For example, in tests similar to the CarPartMaker, Inc. example above, it was observed that the inventors' technology provided significantly better performance in terms of time and bandwidth necessary to replicate data than was available in the prior art. Exemplary test results are described below.

In a first test where simulated data centers at each remote site had 13,675 files (1.17 gigabytes of data) in Seimens SolidEdge format, and 1,703 new files (170.9 megabytes of data) in that same format were added at one site and needed to be synchronized to three other sites, using the described technology allowed the synchronization to be completed using a simulated 10 Mbps broadband connection in only 24.2 minutes, or with a simulated 45 Mbps T3 connection in 21 minutes. By contrast, the tested prior art technology required 290.4 at broadband speeds and 81 minutes at T3 speeds to complete the synchronization. The bandwidth used at each site was also improved, with the inventors' technology requiring only 23.1 megabytes at the originating location, and 25 megabytes at each other location. By contrast, the tested prior art technology required 489.2 megabytes at the originating location, and 163.1 megabytes at each other location.

In a second test where the simulated data centers at each remote site had the same 13,675 files (1.17 gigabytes of data) in Seimens SolidEdge format, and it was necessary to verify that the files at the remote sites were, in fact, identical, using the described technology allowed the synchronization of the remote sites to be confirmed in 0.61 minutes using the simulated broadband connection, and in 0.59 minutes using the simulated T3 connection. By contrast, the tested prior art technology required 2.67 minutes at broadband speeds, and 1.56 minutes at T3 speeds to complete the same confirmation. The bandwidth used at each site was also improved, with the inventors' technology requiring only 0.6 megabytes at the site which initiated the confirmation, and 0.1 megabytes at each of the other remote sites. By contrast, the tested prior art technology required 1.7 megabytes at the site which initiated the confirmation, and 0.6 megabytes at each of the other remote sites.

In a third test where a receiving remote site requests an originating remote site to provide a 65.09 megabyte file in AutoCAD DXF format which was derived from a file which had previously been transferred to the receiving remote site, using the described technology allowed the transfer to be completed in 30 seconds over the simulated broadband connection, and in 10 seconds using the simulated T3 connection. By contrast, the tested prior art technology required 298.1 seconds at broadband speeds, and 85 seconds at T3 speeds to complete the same transfer. The bandwidth required for the transfer was also improved, with the inventors' technology requiring only 220 kilobytes at both the originating and receiving remote sites. By contrast, the tested prior art technology required 66,653 kilobytes at both the originating and receiving remote sites.

In a fourth test where two remote sites which were not included in the third test requested that the same 65.09 megabyte file which had been requested in the third test be transferred to those sites, using the described technology allowed the transfer to be completed in 22 seconds over the simulated broadband connection, and in 10 seconds using the simulated T3 connection. By contrast, the tested prior art technology required 596.2 seconds at broadband speeds, and 170 seconds at T3 speeds to complete the same transfer. The bandwidth required for the transfer was also improved, with the inventors' technology requiring no data to be transferred over the local connection of the originating site (this was a result of the data already having been stored by the cloud based transfer service in the third test), and requiring only 220.0 kilobytes for each of the receiving sites. By contrast, the tested prior art technology required 133,306 kilobytes at the originating site, and 66,653 kilobytes at each of the receiving remote sites.

While the above description focused largely on the use of the inventors' technology for synchronizing data between multiple remote sites, it should be understood that the disclosed technology can be applied in other settings as well. For example, in some cases, the inventors' technology could be used for transferring information to a central database without necessarily synchronizing it at multiple remote sites. This could be done, for example, when an organization wishes to maintain a backup facility while taking advantage of the bandwidth reduction and other benefits provided by the inventors' technology. Similarly, the inventors' technology could be used to upload data to a headquarters location without necessarily making it available at remote sites. For example, in a retail environment, the inventors' technology could be used to transfer receipt data from multiple remote stores to a headquarters server.

As another type of variation, it should be understood that, while the above disclosure focused on applications where similar data is identified (and patch files are created) on a file level. For example, in the context of table 8, three files, $F_2$, $F_3$, and $F_4$ were compared with $F_1$, and, as described in the context of that table, the file which was closest to $F_1$ would then be used to create a patch file. However, it is also possible that similar data, as well as the patch file, could be created on a sub-file level. Thus, in the context of table 8, since shard $F_{1-1}$ was identified as being most similar to $F_4$, shard $F_{1-2}$ was identified as being most similar to $F_2$, and shard $F_{1-3}$ was identified as being most similar to $F_3$, and a patch file could be created showing how $F_1$ could be derived from data from all three of those files (i.e., $F_2+F_3+F_4 \rightarrow F_1$ patch). Similarly, in some cases, rather than (or in addition to) maintaining a database of signatures for files at the remote sites, a cloud based transfer service might maintain a database with the signatures of the individual blocks from the remote sites, and the comparisons (and generation of hash files) could be based on those blocks rather than on the files.

Other variations are also possible, and will be immediately apparent to those of ordinary skill in the art in light of this disclosure. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "allocating" things "among" targets should be understood to refer to distributing or assigning the things allocated to the targets such that, if the number of things being allocated is greater than or equal to the number of targets, then each thing target has a different thing assigned or distributed to it, or, if the number of things being allocated is less than the number of targets, then each thing is distributed or assigned to a different target. It should be understood that a subject described as "allocating" things "among" targets is not necessarily the only entity performing acts as part of the allocation. For example, if a computer is defined as allocating files among a set of nodes, then this allocation could take place by adding the files to a queue from which they could be retrieved by the nodes.

When used in the claims, the phrase "at each" followed by a noun or noun phrase and one or more actions, should be understood to mean that each action from the one or more actions is performed by each of the entities represented by the noun or noun phrase.

When used in the claims, "based on" should be understood to mean that something is determined at least in part by the thing that it is indicated as being "based on." When something is completely determined by a thing, it will be described as being "based EXCLUSIVELY on" the thing.

When used in the claims, a statement that something "completely accounts for" some object should be understood to mean that the entirety of the object is encompassed by the entity or entities which "completely account for" it. For example, a two kilobyte file is "completely accounted for" by a set of portions comprising a first portion made up of the first kilobyte of the file and a second portion made up of the second kilobyte of the file.

When used in the claims, "comprises" should be understood to mean includes, but is not limited to. For example, the months of the year could be described as "comprising" January, July, and October. Similarly, a statement that something is "comprised by" some entity should be understood to mean that the entity comprises the thing it is described as "comprised by". For example, January, July and October could be described as "comprised by" the months of the year. It should be understood that the "comprises" relationship is transitive. For example, the statements that the months of the year "comprise" the months of spring, and that the months of spring "comprise" April, necessarily imply that the months of the year comprise April. The statements that April is "comprised by" the months of spring, and that the months of spring are "comprised by" the months of the year, necessarily imply that April is "comprised by" the months of the year.

When used in the claims, "computer" should be understood to refer to a device, or group of devices, which is capable of performing one or more logical and/or physical operations on data to produce a result. Non-limiting examples of "computers" include, multiprocessor or multicore systems, servers, laptops, desktops, netbooks, and notebooks, as well as handheld devices such as cellular phones, personal digital assistants, and portable game consoles.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, a statement that a thing is "designated as" something else should be understood as meaning that the thing is treated as the thing which it is "designated as". This is similar to the computer programming concept of using the return value of a function, where the statement that the return value obtained by performing the function FOO is designated as the result would be roughly equivalent to the programming command RESULT=FOO( ).

When used in the claims, to "determine" something should be understood to refer to the act of generating, selecting or otherwise specifying the thing "determined". For example, to obtain an output as the result of analysis would be an example of "determining" that output. As a second example, to choose a response from a list of possible responses would be a method of "determining" a response.

When used in the claims, the phrase "for each", followed by a noun or noun phrase, should mean that the statement or statements following the noun or noun phrase apply to each entity referred to by the noun or noun phrase. For example, a statement that, for each direction comprised by the cardinal direction, there is a prayer corresponding to the direction, should be understood to mean that there is a prayer corresponding to north, a prayer corresponding to east, a prayer corresponding to south, and a prayer corresponding to west. When interpreting phrase having the "for each" construction, it should be understood that the "for each" construction describes what applies to the specified objects, and does not necessarily imply additional ordering or structure. For example, the statement that "for each" letter comprised by the first four letters of the alphabet, a sheet of paper has three copies of the letter, would be true for a sheet of paper on which "a b c d a b c d a b c d" was written, and would also be true for a sheet of paper on which "a a a b b b c c c d d d" was written.

When used in the claims, a "functionally derived value" should be understood to be a value which is obtained by performing one or more mathematical or logical operations on the information it is "derived" from. Examples of "functionally derived values" include hash values and checksums.

When used in the claims, a statement that some data, such as a file, is "local" to a computer should be understood to mean that the computer can access the data without using a wide area network or sneakernet.

When used in the claims, the phrase "means for determining matches" should be understood as a means+function limitation as provided for in 35 U.S.C. §112 ¶6, in which the function is "determining matches" and the corresponding structure is a computer configured to perform processes such as illustrated in FIG. 3, step 705 of FIG. 7, and steps 906 and 907 from FIG. 9, or described in the corresponding text, as well as the variations described in the corresponding text.

When used in the claims, the phrase "means for generating difference packages" should be understood as a means+function limitation as provided for in 35 U.S.C. §112 ¶6, in which the function is "generating difference packages" and the corresponding structure is a computer configured to perform processes such as illustrated in FIGS. 4*a* and 4*b*, or described in the corresponding text, as well as the variations described in the corresponding text.

When used in the claims, the word "node" should be understood to refer to a processing location. Examples of "nodes" include computers, and virtual computers.

When used in the claims, "non-transitory computer readable medium" should be understood to refer to any object, substance, or combination of objects or substances, capable of storing data or instructions in a form in which they can be retrieved and/or processed by a computer. Computer memory such as hard discs, read only memory, random access memory, solid state memory elements, optical discs and registers are examples of "non-transitory computer readable media." However, for the avoidance of doubt "non-transitory computer readable media" should not be understood as including ephemeral transmissions, such as propagating signals.

When used in the claims, the phrase "performing" a specified process "with" some data "as" a value should be understood as analogous to the computer programming concept of calling a function with arguments. For example, "performing a BMI calculation process with 500 as an input weight and 1 as an input height" should be understood as analogous to calling calculateBMI(500, 1). Similarly, a description of steps from the specified process should be understood as being analogous to the implementation of a function. For example, a statement that "performing the BMI calculation process comprises calculating a denominator by squaring the input height and determining a return BMI dividing the input weight by the denominator" would be equivalent to code set forth in table 8:

TABLE 8 illustrative code

```
float calculateBMI(float input_weight, float input_height)
{
    float denominator = float input_height * float input_height;
    float return_BMI = input_weight/denominator;
    return return_BMI;
}
```

Because of this equivalence, a method which included steps of "determining a first BMI by designating a return BMI obtained by performing a BMI calculation process with 500 as an input weight and 1 as an input height as the first BMI" and "determining a second BMI by designating the return BMI obtained by performing the BMI calculation process with 100 as the input weight and 3 as the input height as the second BMI" would result in the first BMI being different from the second BMI, just as a call to calculateBMI(500, 1) would have a different return value than a call to calculateBMI(100, 3).

When used in the claims, the term "portion" should be understood as referring to a section or part of a thing. It should be understood that the term "portion" can refer to the thing itself (i.e., the "portion" corresponds to the whole).

When used in the claims, "providing" something should be understood to refer to making that thing available to that which it is "provided" to. "Providing" should be understood broadly to refer to direct methods of making something available (e.g., sending a file to a receiving computer) and more complicated procedures (e.g., sending the receiving computer a URL from which it could retrieve the file for a limited time).

When used in the claims, "server" should be understood as a term which is synonymous with "computer," and which is used in preference to "computer" to improve the readability of the claims in which it appears.

When used in the claims, the term "set" should be understood to refer to a number, group, or combination of zero or more things.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

When used in the claims, a "signature" which corresponds to something should be understood to refer to data which can be used to identify that which it corresponds to. Examples of signatures which might correspond to files include hash values for those files (which provide identifications for files which are effectively unique), and checksums for those files (which provide identifications which are not as unique as those provided by hash values, but which are generally easier to calculate and store).

When used in the claims, "sub-portion" should be understood as a term which is synonymous with "portion," and which is used in preference to "portion" to improve the readability of the claims in which it appears.

When used in the claims, "sub-set" should be understood as a term which is synonymous with "set," and which is used in preference to "set" to improve the readability of the claims in which it appears.

When used in the claims, "sub-signatures" should be understood as a term which is synonymous with "signature," and which is used in preference to "signature" to improve the readability of the claims in which it appears.

We claim:

1. A method comprising designating a return difference package obtained by performing a differencing process with a first set of data as an input set of data and a set of sub-signatures corresponding to portions of a second set of data as an input base set of sub-signatures as a difference package indicating a derivation of the first set of data, wherein:
   a. the differencing process comprises:
      i. determining if a signature corresponding to a portion of the input set of data matches a sub-signature from the input base set of sub-signatures;
      ii. performing a difference package modification taken from a set of difference package modifications comprising:
         (a) modifying the return difference package to include an instruction to use the portion corresponding to a matching sub-signature from the input base set of sub-signatures in deriving the input set of data; and
         (b) modifying the return difference package to include an instruction to use a sub-portion of the portion of the input set of data in deriving the input set of data;
   b. the first set of data is stored on a first non-transitory computer readable medium local to a computer executing a set of computer executable instructions to perform the differencing process with the first set of data as the input set of data and a set of sub-signatures corresponding to the set of portions of the second set of data as the input base set of sub-signatures;
   c. the second set of data is stored on a second non-transitory computer readable medium which is remote from the first non-transitory computer readable medium.

2. The method of claim 1, further comprising designating a return difference package obtained by performing the differencing process with a third set of data as the input set of data and a set of sub-signatures corresponding to portions of a fourth set of data as the input base set of sub-signatures as a difference package indicating a derivation of the third set of data, wherein:
   a. the set of sub-signatures corresponding to portions of the second set of data comprises a sub-signature corresponding to a portion of the second set of data having a first size;
   b. the set of sub-signatures corresponding to portions of the fourth set of data comprises a sub-signature corresponding to a portion of the fourth set of data having a second size; and
   c. the first size and the second size are different sizes.

3. The method of claim 2, wherein:
   a. the second set of data consists of a file having a first format;
   b. the fourth set of data consists of a file having a second format;
   c. the first size is a portion size identified for use with files having the first format; and
   d. the second size is a portion size identified for use with files having the second format.

4. The method of claim 2, wherein:
   a. the differencing process is performed with the first set of data as the input set of data and the set of sub-signatures corresponding to portions of the second set of data as the input base set of sub-signatures is performed at a first time;
   b. the differencing process is performed with the third set of data as the input set of data and the set of sub-signatures corresponding to portions of the fourth set of data as the input base set of sub-signatures is performed at a second time; and
   c. a determination to use sub-signatures corresponding to portions having the second size rather than sub-signatures corresponding to portions having the first size when determining matches is made between the first time and the first time and the second time.

5. The method of claim 4, wherein the first size is larger than the second size.

6. The method of claim 4, wherein the first size is smaller than the second size.

7. The method of claim 1, wherein:
   a. the differencing process comprises determining if a second signature corresponding to second portion of the input set of data matches a second sub-signature from the input base set of sub-signatures;
   b. the portion of the input set of data has a first size;
   c. the second portion of the input set of data has a second size; and
   d. the first size and the second size are not the same size.

8. The method of claim 7, wherein the portion of the input set of data is a sub-portion of the second portion of the input set of data.

9. The method of claim 1, wherein:
   a. the first set of data includes only one file; and
   b. the second set of data comprises a plurality of files.

10. The method of claim 9, wherein the return difference package obtained by performing the differencing process with the first set of data as the input set of data and the set of sub-signatures corresponding to portions of the second set of data as the input base set of sub-signatures comprises:
    a. an instruction to use a portion of a first file from the plurality of files in deriving the input set of data; and
    b. an instruction to use a portion of a second file from the plurality of files in deriving the input set of data.

11. A machine comprising:
    a. a first non-transitory computer readable medium having stored thereon a first set of data;
    b. a second non-transitory computer readable medium having stored thereon a second set of data;
    c. a first computer local to the first non-transitory computer readable and configured with a set of computer executable instructions operable to cause the computer to perform a differencing process comprising:
       i. determining if a signature corresponding to a portion of an input set of data matches a sub-signature from an input base set of sub-signatures;
       ii. performing a difference package modification taken from a set of difference package modifications comprising:
          (a) modifying a return difference package to include an instruction to use existing data corresponding to a matching sub-signature from the input base set of sub-signatures in deriving the input set of data; and
          (b) modifying the return difference package to include an instruction to use a sub-portion of the portion of the input set of data in deriving the input set of data;
    d. a second computer, wherein the second computer is configured with instructions operable to cause the second computer to cause the first computer to:
       i. perform the differencing process with
          (a) the first set of data as the input set of data; and
          (b) a set of sub-signatures corresponding to portions of the second set of data as the input base set of sub-signatures;

ii. designate the return difference package obtained by performing the differencing process with
  (a) the first set of data as the input set of data; and
  (b) the set of sub-signatures corresponding to portions of the second set of data as the input base set of sub-signatures
  as a difference package indicating a derivation of the first set of data by sending the difference package to the second computer in response to a communication requesting the difference package indicating the derivation of the first set of data.

12. The machine of claim 11 wherein:
a. the second computer is configured with instructions which are operable to cause the second computer to cause the first computer to:
  i. perform the differencing process with
    (a) a third set of data as the input set of data; and
    (b) a set of sub-signatures corresponding to portions of a fourth set of data as the input base set of sub-signatures;
  ii. designate the return difference package obtained by performing the differencing process with
    (a) the third set of data as the input set of data; and
    (b) the set of sub-signatures corresponding to portions of the fourth set of data as the input base set of sub-signatures;
    as a difference package indicating a derivation of the third set of data by sending the difference package to the second computer in response to a communication requesting the difference package indicating the derivation of the third set of data;
b. the set of sub-signatures corresponding to portions of the second set of data comprises a sub-signature corresponding to a portion of the second set of data having a first size;
c. the set of sub-signatures corresponding to portions of the fourth set of data comprises a sub-signature corresponding to a portion of the fourth set of data having a second size; and
d. the first size and the second size are different sizes.

13. The machine of claim 12, wherein:
a. the second set of data consists of a file having a first format;
b. the fourth set of data consists of a file having a second format;
c. the first size is a portion size identified for use with files having the first format; and
d. the second size is a portion size identified for use with files having the second format.

14. The machine of claim 12, wherein the second computer is configured with instructions operable to cause the second computer to:
a. cause the first computer to:
  i. perform the differencing process with
    (a) the first set of data as the input set of data; and
    (b) the set of sub-signatures corresponding to portions of the second set of data as the input base set of sub-signatures at a first time;
  ii. perform the differencing process with
    (a) the third set of data as the input set of data; and
    (b) the set of sub-signatures corresponding to portions of the fourth set of data as the input base set of sub-signatures at a second time;
b. determine to use sub-signatures corresponding to portions having the second size rather than sub-signatures corresponding to portions having the first size between the first time and the second time.

15. The machine of claim 11, wherein:
a. the differencing process comprises determining if a second signature corresponding to a second portion of the input set of data matches a second sub-signature from the input base set of sub-signatures;
b. the portion of the input set of data has a first size;
c. the second portion of the input set of data has a second size; and
d. the first size and the second size are not the same size.

16. The machine of claim 11, wherein:
a. the first set of data includes only one file; and
b. the second set of data comprises a plurality of files.

17. The machine of claim 16, wherein the return difference package obtained by performing the differencing process with
a. the first set of data as the input set of data; and
b. the set of sub-signatures corresponding to portions of the second set of data as the input base set of sub-signatures;
comprises:
  A. an instruction to use a portion of a first file from the plurality of files in deriving the input set of data; and
  B. an instruction to use a portion of a second file from the plurality of files in deriving the input set of data.

* * * * *